United States Patent
Assao et al.

(10) Patent No.: US 12,488,764 B1
(45) Date of Patent: Dec. 2, 2025

(54) COMPRESSING IMAGES FOR DISPLAY ON ELECTRONIC LABELS

(71) Applicant: Amazon Technologies, Inc., Seattle, WA (US)

(72) Inventors: Sunil Felix Assao, Livermore, CA (US); Joseph W. Chauvin, Sammamish, WA (US); Nirmal Doshi, Bothell, WA (US); Garth M. Jackson, Vashon, WA (US); Yi-Kuo Jen, Kirkland, WA (US); Dnyanesh P. Joshi, San Jose, CA (US); Snigdhendu Sekhar Mukhopadhyay, San Jose, CA (US); Alpeshkumar Manubhai Vaghasia, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 260 days.

(21) Appl. No.: 18/165,277

(22) Filed: Feb. 6, 2023

(51) Int. Cl.
*G06T 17/20* (2006.01)
*G09G 3/34* (2006.01)

(52) U.S. Cl.
CPC ....... *G09G 3/3453* (2013.01); *G09G 2340/02* (2013.01); *G09G 2340/0464* (2013.01); *G09G 2350/00* (2013.01); *G09G 2370/02* (2013.01); *G09G 2380/04* (2013.01)

(58) Field of Classification Search
None
See application file for complete search history.

(56) References Cited

U.S. PATENT DOCUMENTS

| | | | | |
|---|---|---|---|---|
| 2006/0221089 A1* | 10/2006 | Kawamoto | ............ | G09G 5/363 345/531 |
| 2008/0143731 A1* | 6/2008 | Cheng | ........................ | G06T 1/20 345/545 |
| 2010/0238008 A1* | 9/2010 | Hamachi | ............... | G09G 3/2096 345/531 |
| 2011/0025461 A1* | 2/2011 | Nobutsugu | ........... | G06Q 10/087 340/5.92 |
| 2014/0071467 A1* | 3/2014 | Asada | ................. | G06K 15/1872 358/1.9 |
| 2016/0048907 A1* | 2/2016 | Park | .................... | G06Q 30/0641 345/634 |
| 2017/0287025 A1* | 10/2017 | Kim | .................... | G06Q 30/0601 |
| 2018/0240440 A1* | 8/2018 | Furihata | ................. | G09G 5/395 |
| 2020/0349505 A1* | 11/2020 | Coleman | ........... | G06K 19/06028 |

(Continued)

FOREIGN PATENT DOCUMENTS

JP 2022092684 A * 6/2022

*Primary Examiner* — Sultana M Zalalee
(74) *Attorney, Agent, or Firm* — Athorus, PLLC

(57) ABSTRACT

Where an image displayed by an electronic label depicts information that requires replacement or revision, data for causing the revised information to be displayed by the electronic label is reduced. The data represents portions of the image depicting the information that requires replacement or revision, rather than an entirely new image. Such portions are smaller in size than an image then being displayed, and are transmitted to the electronic label when such changes or required, or along with the image then being displayed. Such portions may also be compressed or uncompressed versions of the images, and may be represented as sets of code words including one or more bytes that identify rows or pixels having discrete colors.

20 Claims, 23 Drawing Sheets

(56) References Cited

U.S. PATENT DOCUMENTS

2022/0172403 A1\* 6/2022 Kim .................... G06T 3/40
2023/0186866 A1\* 6/2023 Shi .................... G09G 3/344
                                                   345/107

\* cited by examiner

COMPRESSING IMAGES FOR DISPLAY ON ELECTRONIC LABELS

BACKGROUND

An electronic label (sometimes called an "electronic shelf label") is an electronic device that is provided in association with a shelf, a fixture, or another surface or feature for accommodating items at a retail establishment or in any other location. An electronic label is a substantially small, low-cost system having a display for presenting relevant information regarding an item, such as a name or a title of the item, a price of the item, a rating of the item, or any other details, for viewing by prospective customers. An electronic label may wirelessly connect with any number of external systems, which may transmit, or push, information or data to the electronic label over one or more networks, execute one or more algorithms or processes to cause the information or data received from such systems to be displayed thereon.

In order to display an image to customers, an electronic label must receive the image from an external system, e.g., a base station, store the image in one or more onboard memory components, and render the image on a display. Images transmitted to electronic labels may typically have limited levels of resolution, and are typically displayed with a limited number of bits per pixel.

Where electronic labels are deployed in large numbers and at various locations, images corresponding to items that are made available to customers must be transmitted to electronic labels at such locations. Typically, a new image is transmitted to an electrical label each time that an attribute of information provided in the image changes. For example, where an electronic label displays an image bearing a price of an item, the image must be replaced when the price of the item changes. Similarly, where an electronic label is provided at a location where one item is made available to customers, e.g., a shelf, a fixture, or another surface or feature, and an image including information regarding that item is displayed by the electronic label, a different image must be transmitted to the electronic label for display thereon where a different item is made available at that location.

Repeated transmissions of images to electronic labels, however, tends to occupy bandwidth of networks to which such labels are connected. Moreover, receiving, storing and displaying images, or executing algorithms, tends to consume electrical power of an electronic label, thereby reducing the battery life of the electronic label.

DETAILED DESCRIPTION

Figure 1A:
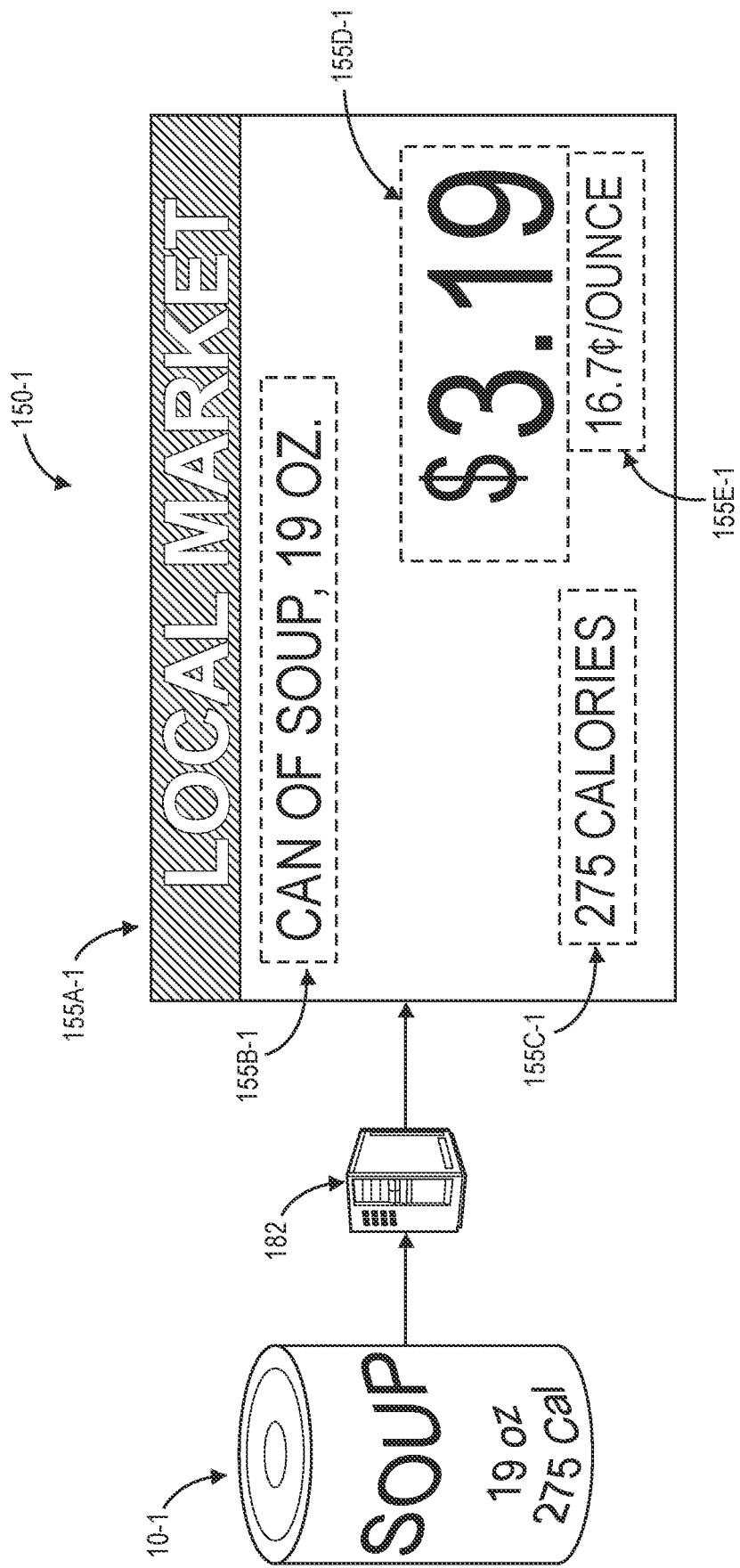
FIGS. 1A through 1F are views of aspects of one system for compressing images in accordance with implementations of the present disclosure.

As is set forth in greater detail below, the present disclosure is directed to systems and methods for compressing images for display on electronic labels. More specifically, one or more implementations of the present disclosure are directed to systems and methods for reducing an amount of data to be transmitted by external systems, e.g., base stations, to electronic labels thereby reducing both an amount of network bandwidth occupied by such transmissions, and electrical power consumed by such electronic labels in receiving, storing and displaying the images to customers.

In accordance with implementations of the present disclosure, an electronic label may receive an image including information from an external system at a first time. The information may relate to an item, e.g., a commercial product made available for sale at a location associated with the electronic label, such as a shelf, a storage unit or another product space, or to any other aspect of the location.

Where any information depicted within an image displayed by an electronic label has changed or is obsolete, portions of images (e.g., images that are smaller in size than the image then being displayed by the electronic label) that include updated or relevant information may be transmitted to the electronic label, along with identifiers of one or more locations or other portions of the image rendered on a display, and the electronic label may display such portions in such locations, e.g., as replacements for the changed or obsolete information. By transmitting only portions of an image to an electronic label, rather than an entire replacement image, bandwidth and battery life may be preserved.

Similarly, an image (or a portion of an image) to be displayed by an electronic label may include information depicted using one or more characters provided in predetermined locations of the image. The image may be transmitted to the electric label, along with one or more sets of characters that may be sized, shaped or configured for display within the predetermined locations, and the image and such sets of characters may be stored on the electronic label. Where any of the information depicted within the image has changed or is obsolete, instructions for displaying one or more characters of the respective sets within the predetermined locations, to depict updates to the information within the image, or to depict relevant information within the image, may be transmitted to the electronic label.

An image (or a portion of an image) to be displayed by an electronic label may be compressed by run-length-encoding (or "RLE"), or in any other manner, on a row-by-row basis, once for each color plane of the image. Where displaying a compressed row of the image would require a smaller amount of data to be transmitted to the electronic label than displaying an uncompressed row of the image, a code word for displaying the compressed row either individually or with one or more other rows may be generated. Where displaying the uncompressed row of the image would require a smaller amount of data to be transmitted to the electronic label than displaying the compressed row of the image, a code word for displaying the uncompressed row may be generated. Code words for displaying rows of the image may be transmitted to the electronic label. Where updates or revisions to the image (or to a portion of the image) are required, rows of the image requiring updating or revision may be identified, and code words for displaying updated or revised pixels or rows of the image in a compressed or uncompressed manner may be generated and transmitted to the electronic label. The use of run-length-encoding may be particularly useful for electronic labels, which typically utilize processors that operate at low powers and store data in memory components at defined offsets, without performing any substantial or complex computations.

Referring to FIGS. 1A through 1F, views of aspects of one system for compressing images in accordance with implementations of the present disclosure are shown. As is shown in FIG. 1A, information regarding an item 10-1, viz., a can of soup, is provided to or obtained by a server 182 (or a base station or another computer device or system) that may be associated with a materials handling facility, such as a retail store or establishment, e.g., in a common physical location of the materials handling facility, or in one or more alternate or virtual locations, e.g., in a "cloud"-based environment. As is also shown in FIG. 1A, based on the information regarding the item 10-1, the server 182 generates an image 150-1 depicting information regarding the item 10-1 for display by an electronic label. The image 150-1 has a rectangular shape and an aspect ratio, or any other proportions or dimensions that may be selected on any basis, including but not limited to one or more dimensions of an electronic label by which the image 150-1 is to be displayed.

The image 150-1 includes a banner 155A-1 including information directly relating to the materials handling facility at which the item 10-1 is available to customers or the item 10-1 itself, such as an identifier 155B-1 of the item 10-1, nutritional information 155C-1 regarding the item 10-1, a price 155D-1 of the item 10-1 and a unit price 155E-1 of the item 10-1. The banner 155A-1, the identifier 155B-1, the nutritional information 155C-1, the price 155D-1 and the unit price 155E-1 are depicted in discrete locations on the image 150-1.

Figure 1B:
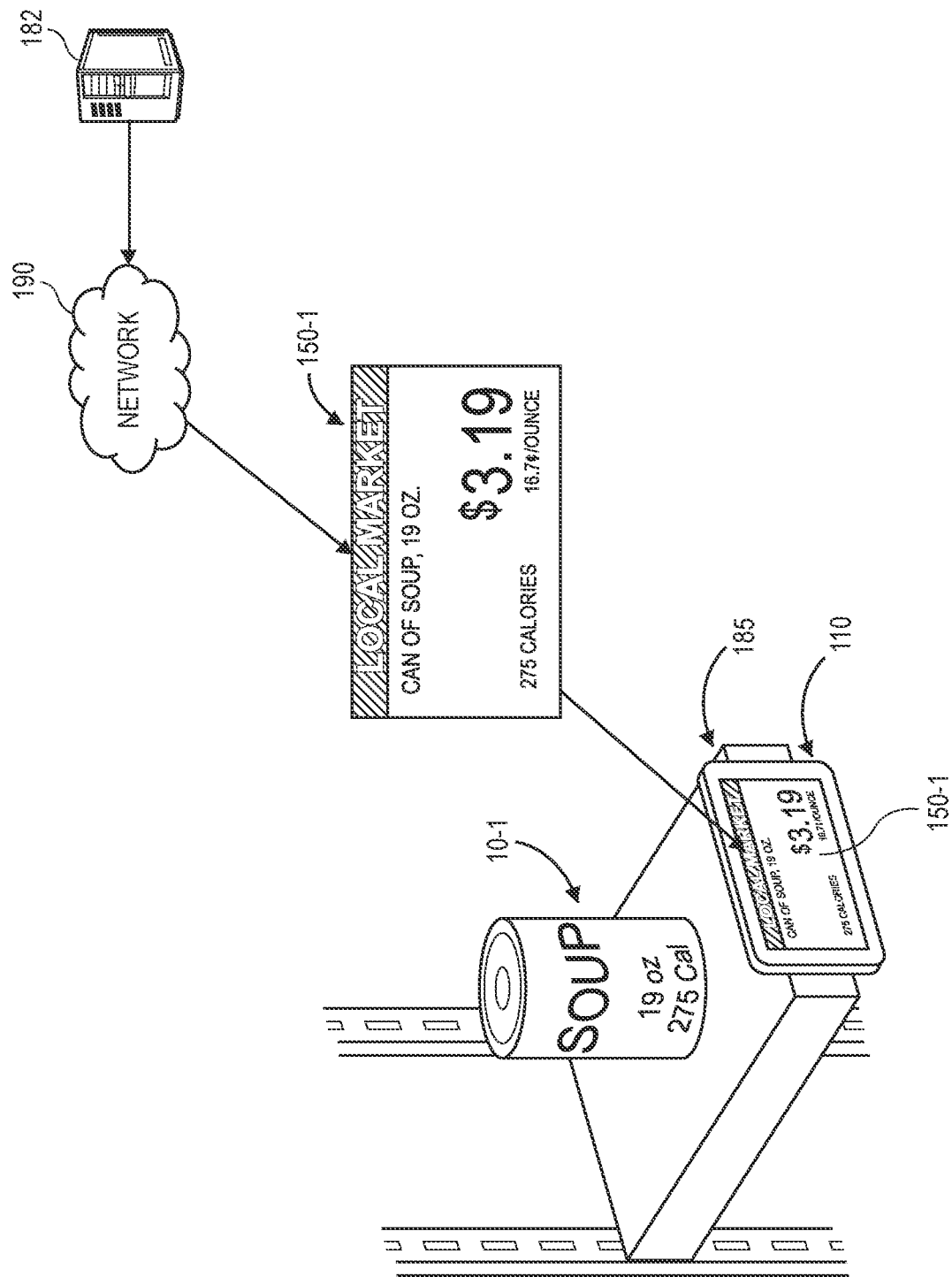
Figure 1D:
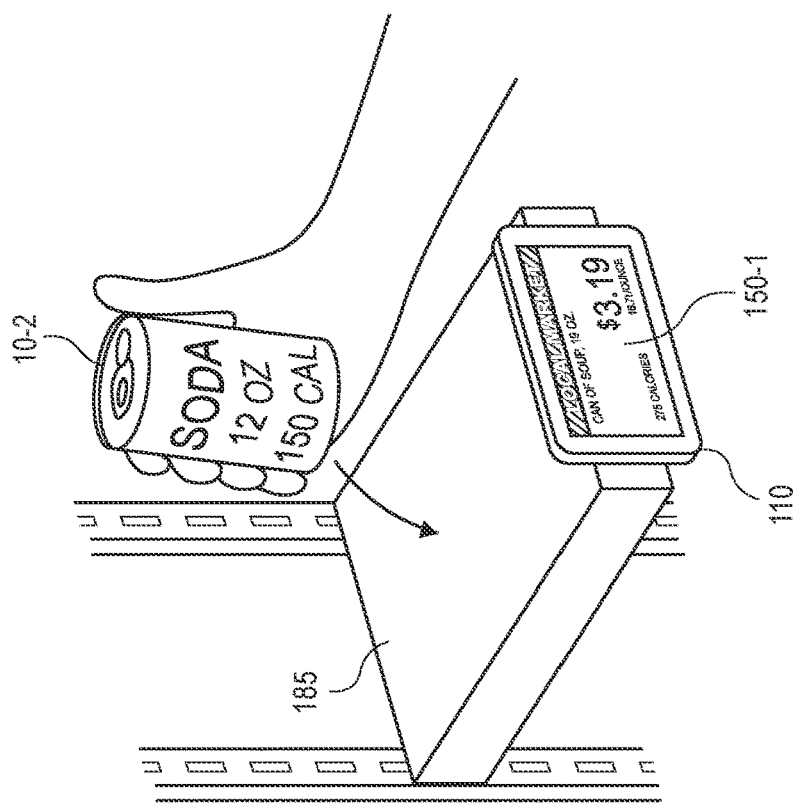
Figure 1C:
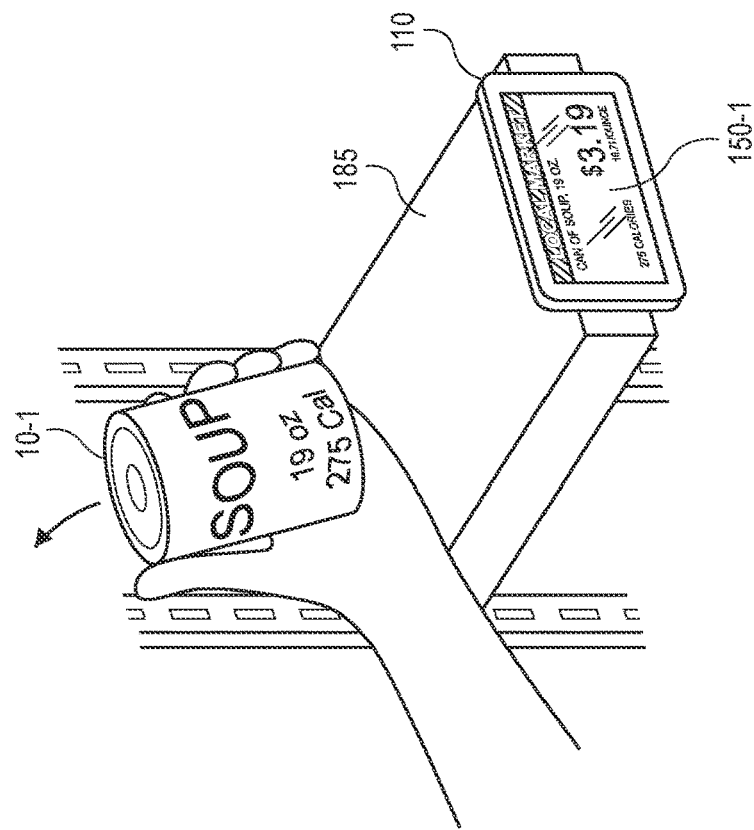

As is shown in FIG. 1B, after the image 150-1 has been generated based on the information regarding the item 10-1, the image 150-1 is transmitted by the server 182 to an electronic label 110 over one or more networks 190, which may include the Internet in whole or in part. The electronic label 110 includes a display provided in association with a frame, a housing or another structure, and is mounted at a front edge or another portion of a shelf 185 or another product space (e.g., a section or an area having one or more surfaces for accommodating items) including the item 10-1 thereon. Upon receiving the image 150-1, the electronic label 110 causes the image 150-1 to be displayed on the electronic label 110, such that customers who may be interested in purchasing the item 10-1 may read and interpret the information displayed on the electronic label 110.

Although the shelf 185 of FIG. 1B includes just a single item 10-1 thereon, in some implementations, the shelf 185 may include any number of the items 10-1 thereon.

Moreover, in some implementations, information depicted in the image 150-1 may only indirectly relate to the materials handling facility or the item 10-1. For example, the image 150-1 may depict information regarding holidays or events of significance to the materials handling facility or for which the item 10-1 may be appropriate, such as where the banner 155A-1 reads "Fourth of July" or "Halloween Candy," as well as information regarding prevailing weather conditions, upcoming events such as parades or festivals, or any other information. Alternatively, in some other implementations, the electronic label 110 may be provided in a location not associated with any items (e.g., commercial products), and the information depicted in the image 150-1 likewise need not relate to any such items. For example, where the electronic label 110 is provided in association with a gas pump or other system at an automobile service station, the image 150-1 may depict a price of gasoline or other products or commodities. Where the electronic label 110 is provided in association with a hotel, a conference room, an apartment, a berthing, or any other room or space, the image 150-1 may depict information regarding occupants of the room or space, or events occurring within the room or space, or any other information. The applications or functions with which the electronic label 110 or other electronic labels of the present disclosure may be utilized or associated are not limited.

In accordance with implementations of the present disclosure, information depicted within an image displayed by an electronic label, such as the electronic label 110 of FIG. 1, may require changing or updating at any time or for any reason. For example, as is shown in FIGS. 1C and 1D, when the item 10-1 is removed from the shelf 185, e.g., by a customer, an associate, or any other human or machine, and an item 10-2, viz., a can of soda, is placed thereon, the information depicted within the image 150-1 displayed by the electronic label 110 is obsolete and requires revision. Alternatively, the item 10-1 or the item 10-2 may be one or more of a baked food, a beverage, a frozen food, a prepared food, a sandwich or a snack food, or any other type of item or product that may be made available to customers.

Figure 1E:
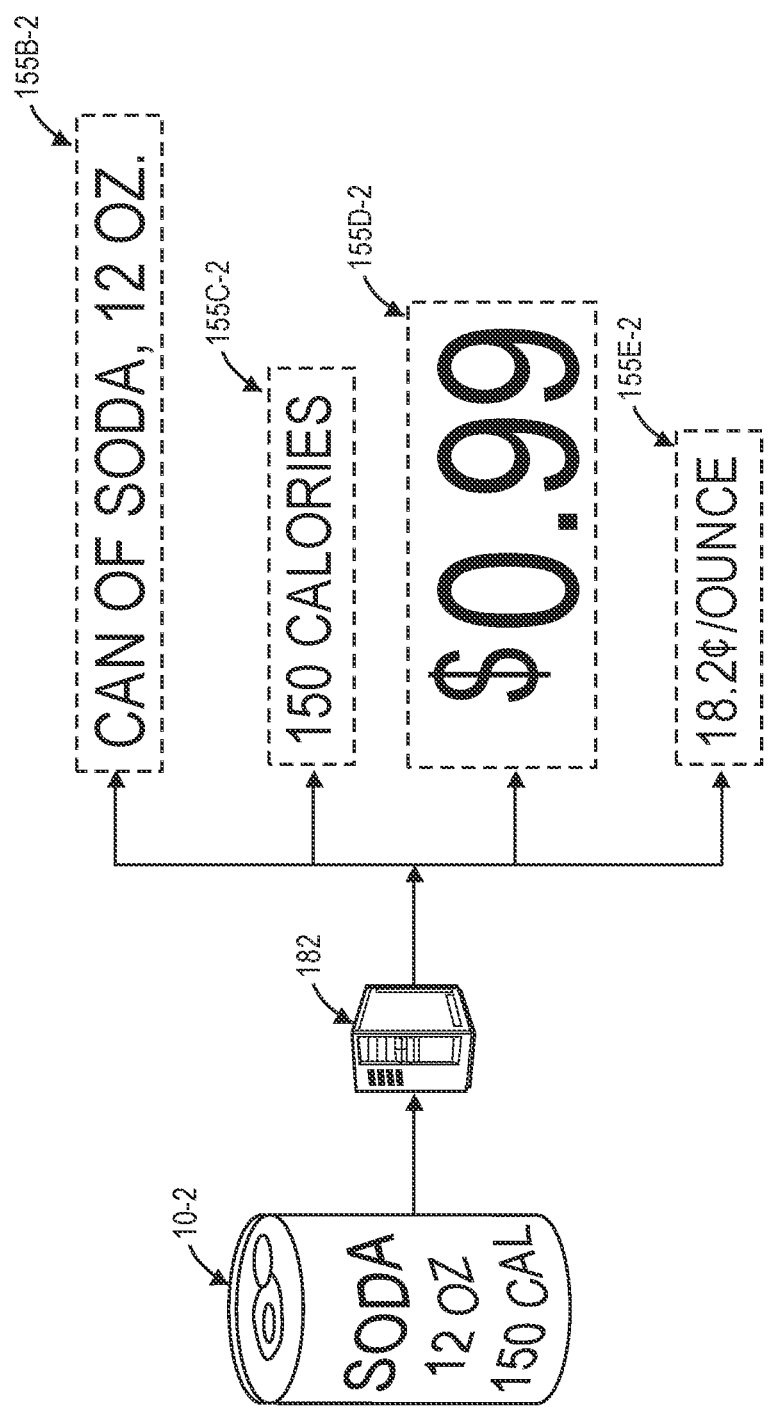

As is shown in FIG. 1E, information regarding the item 10-2 is provided to or obtained by the server 182. As is also shown in FIG. 1E, based on the information regarding the item 10-2, the server 182 generates portions 155B-2, 155C-2, 155D-2, 155E-2 of an image depicting information regarding the item 10-2 for display by the electronic label 110. The portions 155B-2, 155C-2, 155D-2, 155E-2 include, but need not be limited to, an identifier 155B-2 of the item 10-2, nutritional information 155C-2 regarding the item 10-2, a price 155D-2 of the item 10-2 and a unit price 155E-2 of the item 10-2. The identifier 155B-2, the nutritional information 155C-2, the price 155D-2 and the unit price 155E-2 are sized and shaped to be depicted in discrete locations on an image corresponding to locations of the identifier 155B-1, the nutritional information 155C-1, the price 155D-1 and the unit price 155E-1 of the item 10-1 depicted within the image 150-1. As is also shown in FIG. 1E, the portions 155B-2, 155C-2, 155D-2, 155E-2 are smaller in size than the image 150-1.

Figure 1F:
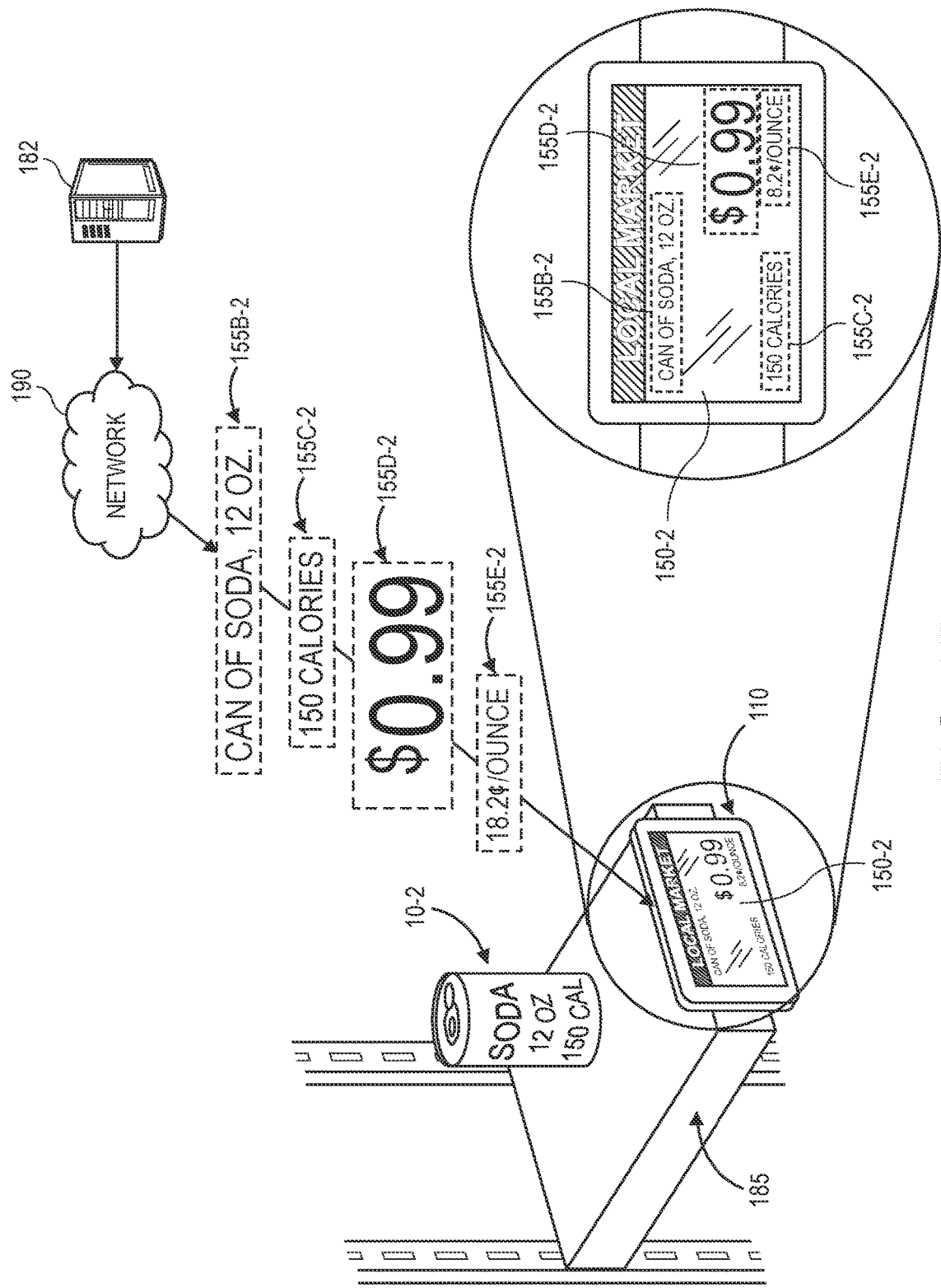

As is shown in FIG. 1F, after the portions 155B-2, 155C-2, 155D-2, 155E-2 of the image have been generated based on the information regarding the item 10-2, the portions 155B-2, 155C-2, 155D-2, 155E-2 are transmitted by the server 182 to the electronic label 110 over the one or more networks 190. Upon receiving the portions 155B-2, 155C-2, 155D-2, 155E-2, the electronic label 110 causes an image 150-2 including the portions 155B-2, 155C-2, 155D-2, 155E-2 to be displayed in locations of the identifier 155B-1, the nutritional information 155C-1, the price 155D-1 and the unit price 155E-1 of the item 10-1 depicted within the image 150-1, such that customers who may be interested in purchasing the item 10-2 may read and interpret the information displayed on the electronic label 110.

By transmitting only the portions 155B-2, 155C-2, 155D-2, 155E-2 to the electronic label 110, rather than the image 150-2 as a whole, bandwidth required to update the information depicted in the electronic label 110 upon the placement of the item 10-2 on the shelf 185 may be significantly reduced. Moreover, receiving and storing such portions, and displaying such portions in corresponding locations on the image 150-1 to form the image 150-2 may consume a substantially smaller amount of processing capacity or battery power than if the image 150-2 had been transmitted to the electronic label 110 in its entirety. Reductions in bandwidth, processing capacity or battery power consumed may be compounded where the shelf 185 is one of many such shelves provided in a materials handling facility, and where the electronic label 110 is one of many such labels provided in association with such shelves.

Figure 2A:
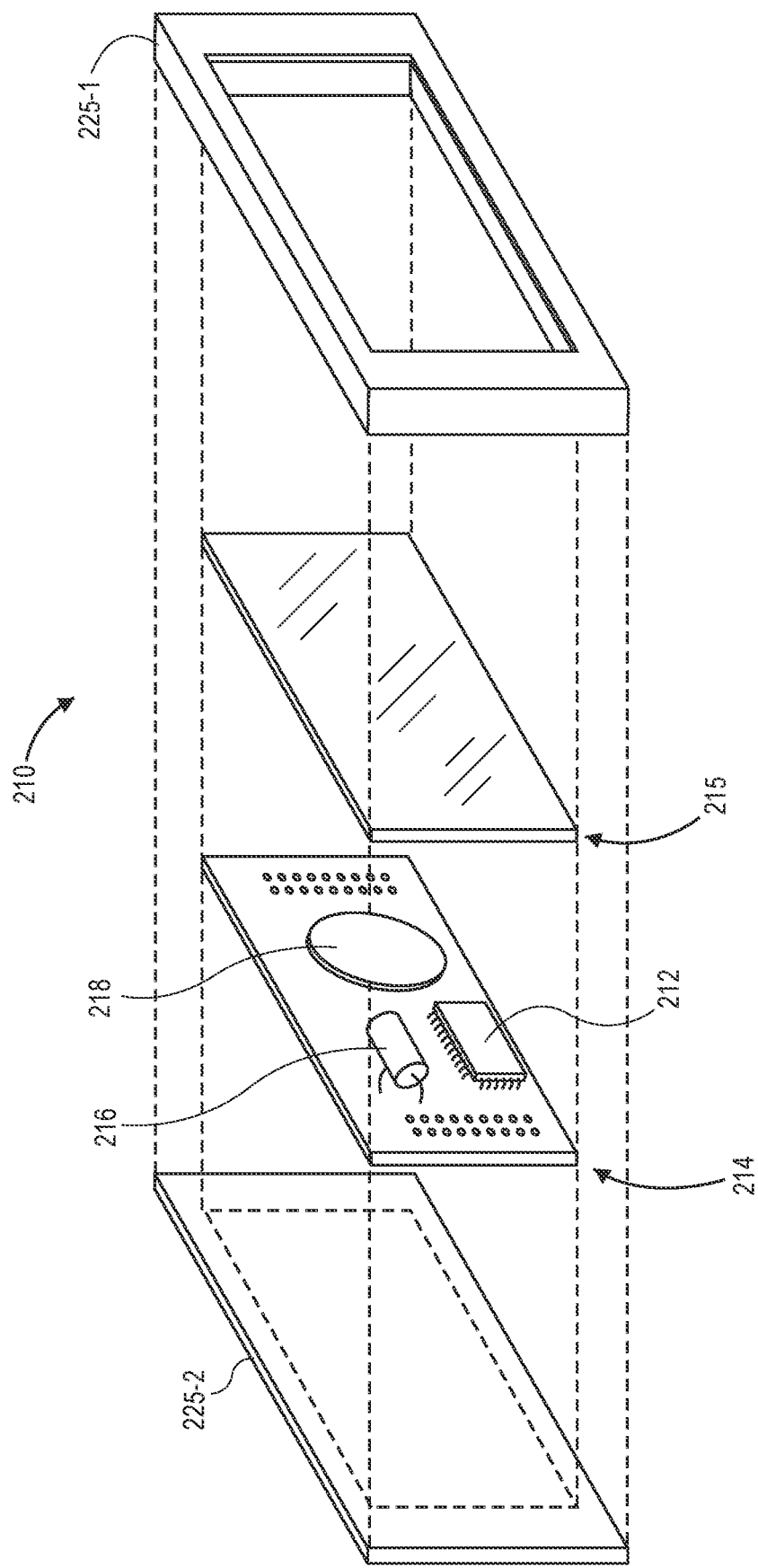
FIGS. 2A and 2B are views of aspects of one system for compressing images in accordance with implementations of the present disclosure.
Figure 2B:
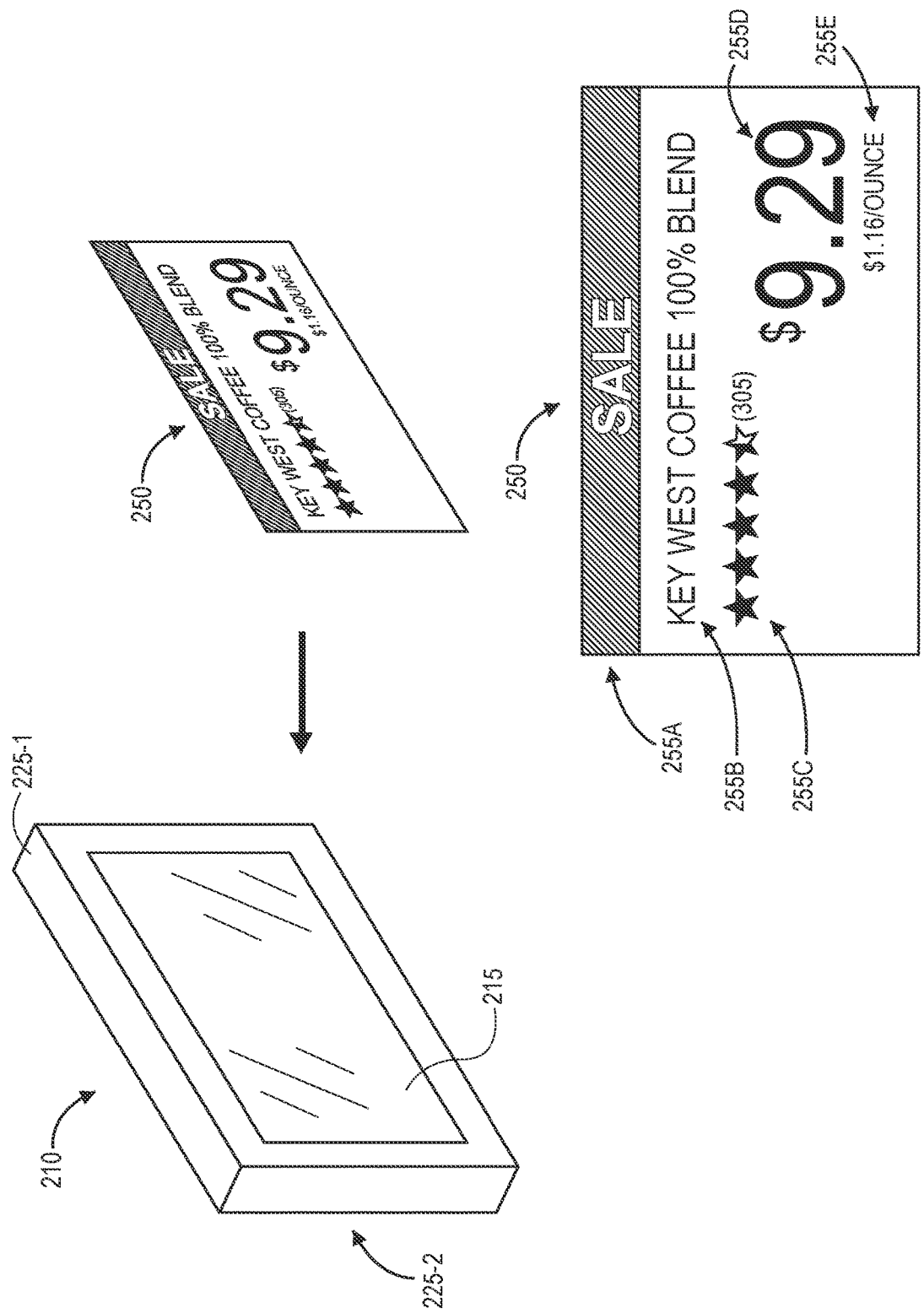

Referring to FIGS. 2A and 2B, views of aspects of one system for compressing images in accordance with implementations of the present disclosure are shown. Except where otherwise noted, reference numerals preceded by the number "2" shown in FIG. 2A or 2B indicate components or features that are similar to components or features having reference numerals preceded by the number "1" shown in FIGS. 1A through 1F.

FIG. 2A is an exploded view of various aspects of one electronic label 210 in accordance with implementations of the present disclosure. As is shown in FIG. 2A, the electronic label 210 includes one or more processors 212 or other components provided on a circuit board 214, along with a transceiver 216 and a battery 218. Adjacent the circuit board 214, a display 215 (e.g., an electronic ink display) may be provided and coupled to the circuit board 214.

As is further shown in FIG. 2A, the electronic label 210 includes a front case 225-1 and a rear panel 225-2 that may mate or otherwise be combined to define a housing including the circuit board 214, the display 215 and other components therein. In some implementations, the rear panel 225-2 may include one or more features for enabling the electronic label 210 to be mounted to a shelf, a fixture or another surface or feature. The one or more processors 212, the circuit board 214, the transceiver 216 and the battery 218 are provided within the housing defined by the front case 225-1 and the rear panel 225-2, when the front case 225-1 is mated to the rear panel 225-2.

As is shown in FIG. 2B, the electronic label 210 may receive an image 250 to be displayed by the electronic label 210 over one or more networks (not shown) by the transceiver 216, and such images may be caused to be displayed on the display 215 by the processors 212 or any other components. The image 250 may include a banner or another indicator 255A of a status of an item (e.g., whether the item is on sale or available at a reduced price, or whether the item is subject to any promotions) or an identifier or label of any other information regarding the item, which may be provided along an upper edge, border or margin of the image 250, or in any other location of the image 250. The image 250 may further include a name 255B or another identifier of the item, which may be aligned substantially horizontally within the image 250, or in any other orientation. The image 250 may also include a rating 255C of the item, which may be expressed in a quantitative or qualitative manner, e.g., based on number scales or a "star" system, e.g., a number of positive ratings, or "four-and-a-half out of five stars," or in a similar or equivalent manner. The image 250 may further include a price 255D and a unit price 255E of the item, which may be expressed in any manner or currency. The name 255B, the rating 255C, the price 255D or the unit price 255E may be depicted within the image 250 in any font or according to any standard, in any location within the image 250, and in any size, which may be selected on any basis.

Alternatively, the image 250 may depict any information other than the banner 255A, the name 255B, the rating 255C, the price 255D or the unit price 255E, and such information may but need not relate to any item or commercial product.

Figure 3A:
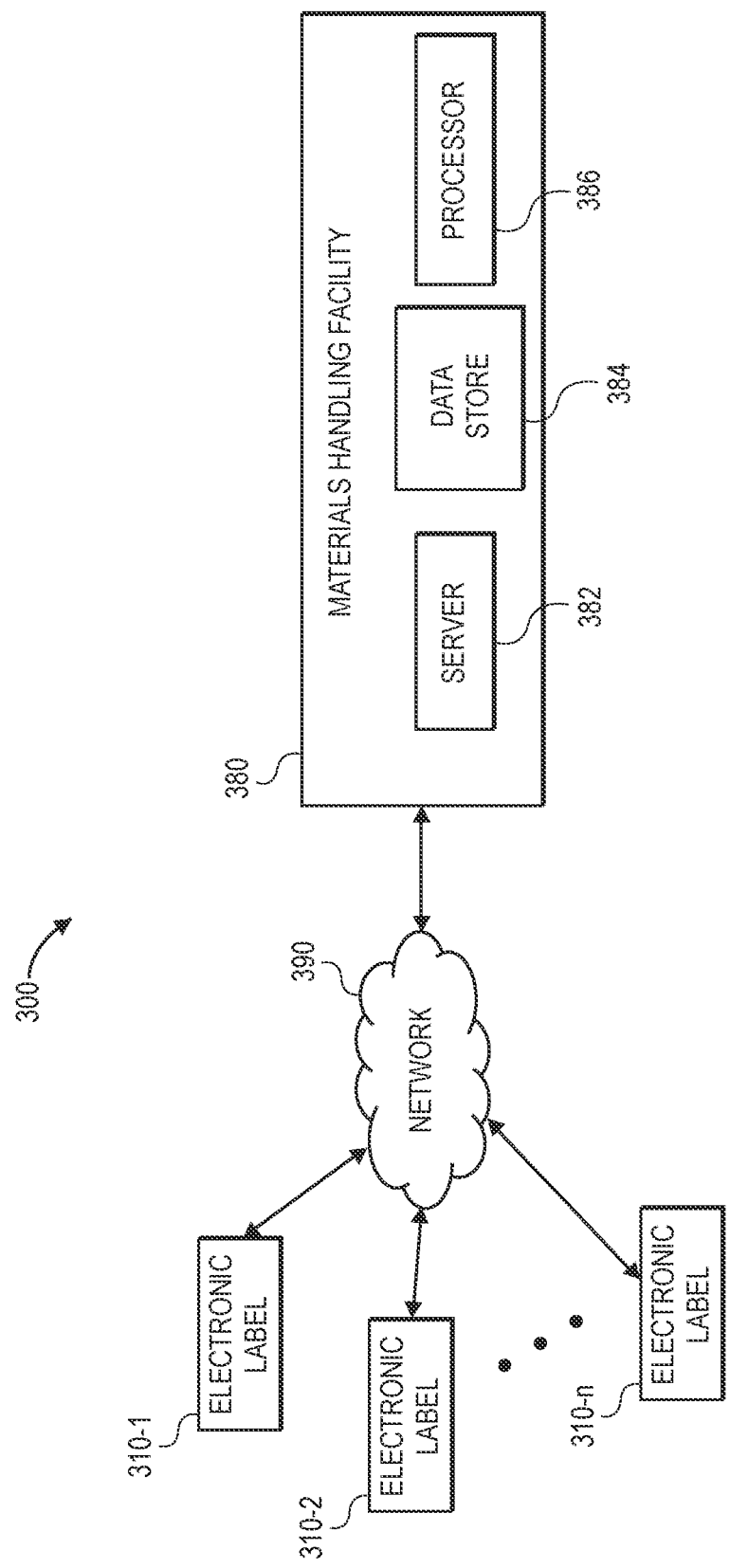
FIGS. 3A and 3B are block diagrams of components of one system for compressing images in accordance with implementations of the present disclosure.
Figure 3B:
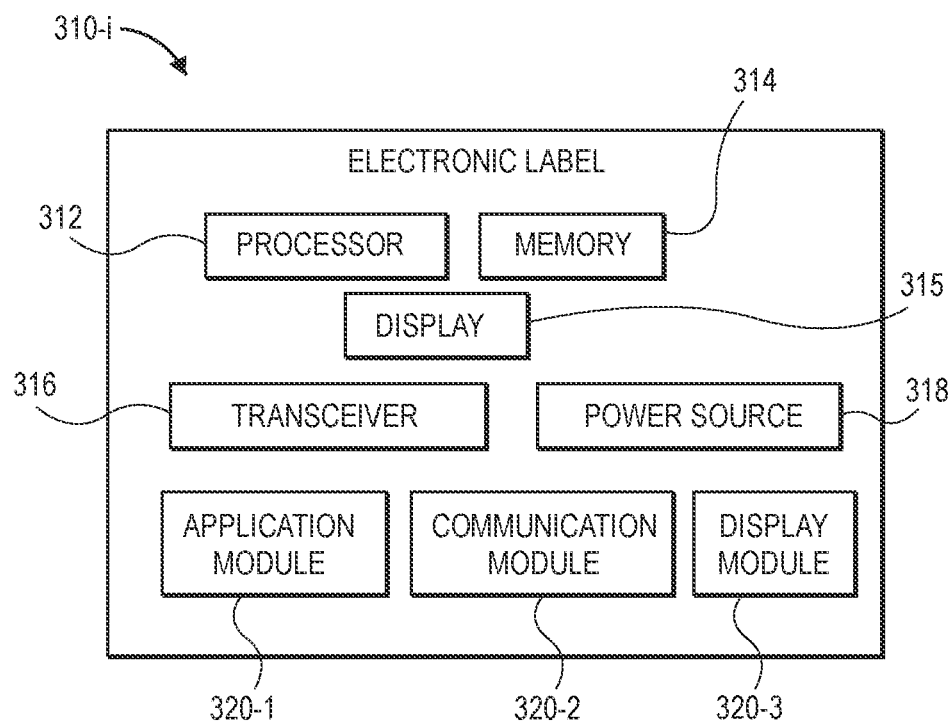

Referring to FIGS. 3A and 3B, block diagrams of components of one system for compressing images in accordance with implementations of the present disclosure are shown. Except where otherwise noted, reference numerals preceded by the number "3" shown in FIG. 3A or 3B indicate components or features that are similar to components or features having reference numerals preceded by the number "2" shown in FIG. 2A or 2B or by the number "1" shown in FIGS. 1A through 1F.

The system 300 includes a plurality of electronic labels 310-1, 310-2 . . . 310-$n$ provided in association with a materials handling facility 380. The electronic labels 310-1, 310-2 . . . 310-$n$ and one or more systems or components of the materials handling facility 380 may be connected to one another across a network 390, which may include the Internet in whole or in part.

The electronic labels 310 may be any systems or components that may be provided in association with one or more shelves or other product spaces of the materials handling facility 380, and may be programmed, configured or adapted to display images to customers regarding items made available on such shelves or at such product spaces.

The materials handling facility 380 may be any facility that is adapted to receive, store, process and/or distribute items from a variety of sources to a variety of destinations, e.g., on behalf of or for an electronic marketplace, or on behalf of or for any other entity. The materials handling facility 380 may be configured to receive any type or kind of inventory items from various sources, to store the inventory items until a user orders or retrieves one or more of the items, or to distribute the inventory items to the user. For example, inventory items such as merchandise, commodities, perishables or any other type of item may be received from one or more suppliers, e.g., manufacturers, distributors, wholesalers, vendors or the like, at the materials handling facility 380. Upon their arrival at the materials handling facility 380, the inventory items may be prepared for storage, such as by unpacking or otherwise rearranging the inventory items, and updating one or more records to reflect the types, quantities, conditions, costs, locations or any other parameters associated with the arrival of the inventory items. Subsequently, the inventory items may be stocked, managed or dispensed in terms of countable, individual units or multiples of units, such as packages, cartons, crates, pallets or other suitable aggregations. Alternatively, one or more of the items, such as bulk products, commodities, or the like, may be stored in continuous or arbitrarily divisible amounts that may not be inherently organized into countable units, and may instead be managed in terms of measurable quantities such as units of length, area, volume, weight, time duration or other dimensional properties characterized by units of measurement.

Items may be stored within the materials handling facility 380 on or in product spaces such as shelves, storage units or other like systems, e.g., in aisles, rows, bays, shelves, slots, bins, racks, tiers, bars, hooks, cubbies or other like storage mechanisms. The product spaces of the materials handling facility 380 with which one of the electronic labels 310-1, 310-2 . . . 310-*n* may be mounted or associated may be flat or angled, stationary or mobile, and of any shape or size. In some implementations, all items of a given type or kind may be stored in a common location within an inventory area. In other implementations, like items may be stored in different locations. For example, to optimize the retrieval of items having high turnover rates or velocities within the materials handling facility 380, such items may be stored in several different locations to reduce congestion that might be encountered if the items were to be stored at a single location.

As is shown in FIG. 3A, the materials handling facility 380 includes a networked computer infrastructure for performing various computer-related functions associated with the receipt, storage, processing and distribution of such items, including one or more physical computer servers 382, data stores (e.g., databases) 384 and/or processors 386, that may be provided in the same physical location as the materials handling facility 380, or in one or more alternate or virtual locations, e.g., in a "cloud"-based environment. In some implementations, the servers 382, the data stores 384 and/or the processors 386 or any number of other computing devices or resources may further execute any type of computer-based function or compute any type or form of calculation, including but not limited to any formulas, equations, algorithms or techniques.

Each of the electronic labels 310-1, 310-2 . . . **310-*n* shown in FIG. 3A may include one or more processors, memory or storage components or other relevant features for receiving, storing or displaying images thereon. As is shown in FIG. 3B, a representative one of the electronic labels 310-1, 310-2 . . . 310-*n*, viz., an electronic label 310-*i*, includes one or more processors 312, one or more memory components 314, one or more transceivers 316 and one or more power sources 318, as well as a display 315**.

The processors 312 may be configured to process images, portions of images or sets of characters received from the server 382 or from any other source, and to store such images, portions of images or sets of characters on the one or more memory components 314, or cause such images to be displayed on the display 315.

The display 315 may be any type or form of system or device configured to display images or other information or data. In some implementations, the display 315 may be an electronic ink (or "e-ink," or electronic paper) display having one or more layers of electrodes, pixels or capsules, as well as one or more protective layers. The pixels or capsules may be independently charged to cause pigments that are colored black or white (or other colors such as red or yellow) to be displayed thereby, with sufficiently high levels of contrast. Alternatively, the display 315 may be any other display of any type or form, such as one or more liquid crystal displays (or "LCD"), light-emitting diode (or "LED") or organic light-emitting diode (or "OLED") displays, plasma displays, electrophoretic displays, image projectors, or other display mechanisms.

In some implementations, the transceiver 316 may be configured to enable the electronic label **310-*i* to communicate through one or more wired or wireless means, e.g., standard wireless protocols such as Bluetooth® or any Wireless Fidelity (or "Wi-Fi") protocol. The electronic label 310-*i* may connect to or otherwise communicate with the servers 382, or any other computer devices within the materials handling facility 380 (not shown), or with one or more external computer devices over the network 390**, through the sending and receiving of analog or digital data.

The power sources 318 may be any type or form of battery (e.g., coin-cell batteries, button batteries, watch batteries, or any other batteries having any number of cells), fuel cell, solar panel and/or solar cell (e.g., with one or more supercapacitors) or other power source capable of generating sufficient current flows, at sufficient voltages, for desired durations, in order to power one or more operations of the electronic label **310-*i***.

The electronic label **310-*i* may be further programmed or configured to execute one or more software applications or processes, including but not limited to application modules 320-1, which may access and manage information stored by the memory component 314 regarding one or more items, as well as communication modules 320-2, which may be executed to cause a receipt of information or data (e.g., images) from the server 382 or any other sources, and display modules 320-3, which may be executed to cause a display of one or more images, portions of images or characters of sets to be displayed on the display 315. Alternatively, the electronic label 310-*i*** may be further programmed or configured to execute any number of other software applications or processes.

Although the system 300 of FIG. 3A includes boxes corresponding to three electronic labels 310-1, 310-2 . . . **310-*n*, those of ordinary skill in the pertinent arts will recognize that any number or type of electronic labels or any other systems for receiving, storing and displaying information or data may be provided within the materials handling facility 380 in accordance with the present disclosure. The type or form of systems that may be associated with shelves or other product spaces and may receive, store and display images depicting information associated with items at the materials handling facility 380** are not limited.

The materials handling facility 380 may also include any number of other sensors, components or other features for controlling or aiding in the operation of the materials handling facility 380. The materials handling facility 280 may further include one or more human operators (not shown), such as one or more workers, who may be any designated personnel tasked with performing one or more tasks within the materials handling facility 380 in general, or within one or more inventory areas, receiving stations, distribution stations or other locations of the materials handling facility 380 in particular. Such workers may handle or transport items (e.g., any type or form of good, product, media or other tangible consumer article) within the materials handling facility 380, or operate one or more pieces of equipment therein (not shown). Such workers may also operate one or more specific computing devices or resources for registering the receipt, retrieval, transportation or storage of items within the materials handling facility 380, e.g., a general purpose device such as a personal digital assistant, a digital media player, a smartphone, a tablet computer, a desktop computer or a laptop computer (not shown), which may include any form of input and/or output peripherals such as scanners, readers, keyboards, keypads, touchscreens or like devices.

The computers, servers, devices and other resources described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method (e.g., speech recognition or gesture recognition devices or techniques) to interact with the computers, servers, devices and the like, or to "select" an item, link or any other aspect of the present disclosure.

The electronic labels 310-1, 310-2 . . . 310-n and/or the materials handling facility 380 (or any actors associated therewith) may use any web-enabled or Internet applications or features, any other client-server applications or features, or other messaging techniques, to connect to the network 390 or to communicate with one another. For example, the servers 382 may be adapted to transmit or receive information or data in the form of synchronous or asynchronous messages to or from the electronic labels 310-1, 310-2 . . . 310-n, or any other computer device (e.g., any device having any number of other servers, data stores, processors or the like) in real time or in near-real time, or in one or more offline processes, via the network 390. The protocols and components for providing communication between the servers 382 and the electronic labels 310-1, 310-2 . . . 310-n or any other devices or systems may be well known to those skilled in the art of computer communications and need not be described in more detail herein.

The data and/or computer-executable instructions, programs, firmware, software and the like (also referred to herein as "computer-executable" components) described herein may be stored on a transitory and/or non-transitory computer-readable medium that is within or accessible by computers or computer components such as the servers 382, the data stores 384, the processor 386, the electronic labels 310-1, 310-2 . . . 310-n, the processor 312, or any other computers or control systems having sequences of instructions which, when executed by a processor (e.g., a central processing unit, or "CPU," or a graphics processing unit, or "GPU"), cause the processor to perform all or a portion of the functions, services and/or methods described herein. Such computer-executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Where images regarding products are transmitted to electronic labels for display thereon, and information depicted within such images is obsolete or no longer relevant, an amount of data transmitted to such labels may be reduced by transmitting only portions of images depicting changed or updated information to the electronic label, and updating an image displayed thereon to include such portions.

As used herein, the term "materials handling facility" may include, but is not limited to, warehouses, distribution centers, cross-docking facilities, order fulfillment facilities, packaging facilities, shipping facilities, rental facilities, libraries, retail stores or establishments, wholesale stores, museums, or other facilities or combinations of facilities for performing one or more functions of material or inventory handling for any purpose.

Figure 4:
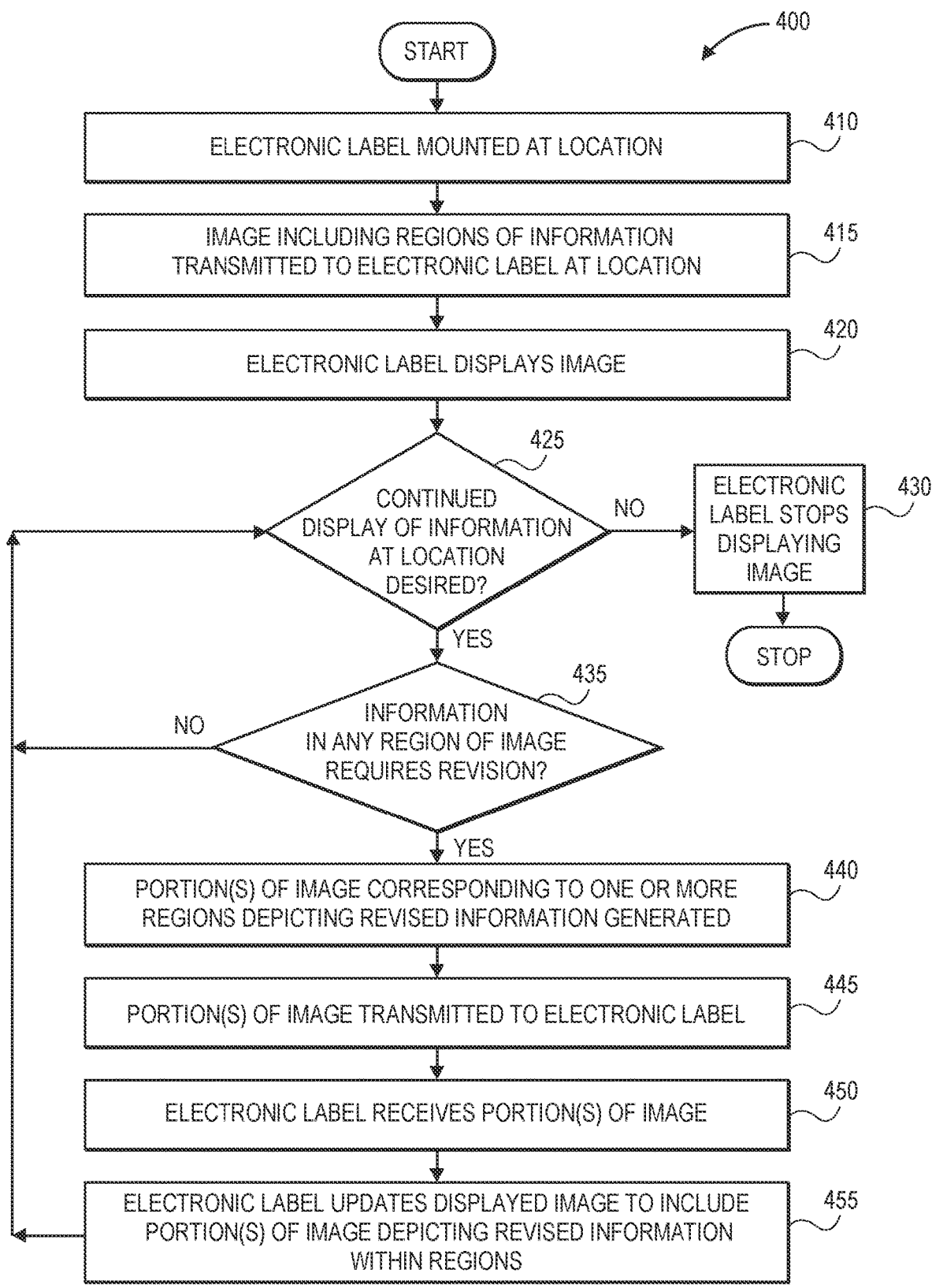
FIG. 4 is a flow chart of one process for compressing images in accordance with implementations of the present disclosure.

Referring to FIG. 4, a flow chart 400 of one process for compressing images in accordance with implementations of the present disclosure is shown.

At box 410, an electronic label is mounted at a location. The electronic label may be a system or device for displaying information or data, e.g., images, regarding the product or the location, such as one or more products provided at the location, one or more activities occurring within a vicinity of the location, or one or more persons associated with the location. The electronic label may include an electronic ink display, or any other display of any type or form, as well as one or more processors, memory components, circuit boards, transceivers, power sources or other components provided within a common housing. In some implementations, the electronic label may be configured for mounting to a front edge of a shelf or another product space, such as in a location configured to accommodate any number of products or items of a single type or kind, or products or items of multiple types or kinds.

Alternatively, the electronic label may be provided in any location, and need not be mounted to a front edge or any other portion of a shelf or other product space. For example, in some implementations, the electronic label may be mounted or otherwise provided in association with a room or other space (e.g., a conference room, a classroom, an office, or a hotel room) and configured to display information or data regarding contents of the room or other space.

At box 415, an image including regions of information is transmitted to the electronic label at the location. The electronic label may be configured to receive information or data, e.g., images, from an external system such as a base station, which may be wirelessly connected to the electronic label and provided within a physical vicinity of the electronic label, or in any other alternate or virtual locations, e.g., in a "cloud"-based environment. The image may be transmitted to the electronic label according to any wireless protocol, e.g., Bluetooth® or any Wi-Fi protocol. The regions depicting the information are subsets of the image that are smaller in size than the image itself.

The image may be represented by data including any number of bits per pixel. In some implementations, the image may be represented by a single bit for each pixel, e.g., one bit-per-pixel, thereby enabling the image to include or depict two colors, such as black and white, or red and any other color. In some implementations, the image may be represented by two bits for each pixel, e.g., two bits-per-pixel, thereby enabling the image to include or depict four colors, such as black, white, red or another color. Alternatively, the image may be represented by any other number of bits per pixel.

At box 420, the electronic label displays the image. For example, the electronic label may receive and store the image in one or more memory components or other features, and one or more processors of the electronic label may cause individual pixels, capsules or other features of a display to render the image thereon.

At box 425, whether the continued display of information at the location is desired is determined. For example, where the image displayed by the electronic label depicts information relating to a product of a single type or form, and multiple products of that type or form were staged at a location associated with the electronic label and made available to customers there, whether the products remain available (e.g., whether the products are in stock, whether the products have been moved, or whether the products have been replaced with other products of other types or forms) at the location may be determined. Where the image displayed by the electronic label relates to events or activities occurring at the location, whether any of such events or activities are in progress or scheduled, or whether each of such events or activities has concluded, is determined.

If continued display of information at the location is no longer desired, then the process advances to box 430, where the electronic label stops displaying the image, and the process ends. For example, in some implementations, the electronic label may be programmed to end displaying the image at a predetermined time. In some other implementations, the electronic label may receive one or more instructions from an external system such as a base station to stop displaying the image.

If continued display of information at the location is desired, however, then the process advances to box 435, where whether any of the information in any of the regions of the image requires revision is determined. If none of the information requires revision, then the process returns to box 425, where whether the product continues to be offered at the location is determined.

If any of the information has changed, such as where a product previously made available at the location is no longer available, where another product is made available at the location, where new or other information is appropriate or relevant for display by the electronic label at the location is identified, or where any of the information displayed by the electronic label is no longer relevant or is obsolete, however, then the process advances to box 440, where one or more portions of an image depicting revised information are generated. Such portions may be smaller in size than the image transmitted to the electronic label at box 415, and may include new or updated information, or may be blank, e.g., to replace or cover up information within the image displayed by the electronic label that has changed or is no longer relevant.

For example, where the electronic label is displayed at a location where products are made available to customers, and a new product is made available at the location, a name of the new product may be identified, and a portion of an image depicting the name of the new product may be generated. Where the image depicts a price of the product, and the price of the product is changed, a portion of an image depicting a new price or a new unit price of the product may be generated. Where the image depicts a rating of the product, and the rating of the product has changed, a portion of an image depicting a new rating of the product may be generated. Where a promotion of the product has begun or ended, such as where the product is available at a sale price or discount price, or where the product is no longer available at the sale price or discount price, a portion of an image indicating that the promotion is in effect or is no longer in effect may be generated.

Alternatively, where any information regarding the product that is depicted within the image displayed by the electronic label is no longer relevant or is obsolete, a portion of an image depicting relevant information may be generated. Moreover, where multiple portions of the information depicted within the image have changed, or are no longer relevant or obsolete, multiple portions of images corresponding to one or more of the regions having changed information may be generated.

At box 445, the one or more portions of the image are transmitted to the electronic label. The portions of the image may be transmitted wirelessly from an external system (e.g., a base station that generated the portions of the image, or on which the portions of the image are stored) to the electronic label according to any wireless protocol. In some implementations, the portions of the image may be transmitted along with information or data regarding a location within the image to which the portions of the image correspond. For example, the portions of the image may be transmitted along with an identifier of a specified location of the image displayed by the electronic label, in (x, y) coordinates or other horizontal and vertical measures, as well as identifiers of offsets including specified horizontal or vertical distances from the specified location. Alternatively, the portions of the image may be transmitted to the electronic label along with any other information or data regarding one or more locations of the image being displayed on the electronic label to which the portions of the image correspond.

At box 450, the electronic label receives the portions of the image, and at box 455, the electronic label updates the image displayed thereon to include the portions of the image depicting the revised information within such regions. For example, the portions of the image may be combined with the image according to any processing techniques, e.g., a bit block transfer (or "bit blt" or "bit blit") operation in which the portions of the image are overwritten onto the image being displayed by the electronic label at specified locations. As a result, and following an update of the image, the image displayed by the electronic label includes other information, such as information that is relevant and not obsolete.

The process then returns to box 425, where whether the product continues to be offered at the location is determined.

Referring to FIGS. 5A through 5F, views of aspects of one system for compressing images in accordance with implementations of the present disclosure are shown. Except where otherwise noted, reference numerals preceded by the number "5" shown in FIGS. 5A through 5F indicate components or features that are similar to components or features having reference numerals preceded by the number "3" shown in FIG. 3A or 3B, by the number "2" shown in FIG. 2A or 2B or by the number "1" shown in FIGS. 1A through 1F.

Figure 5A:
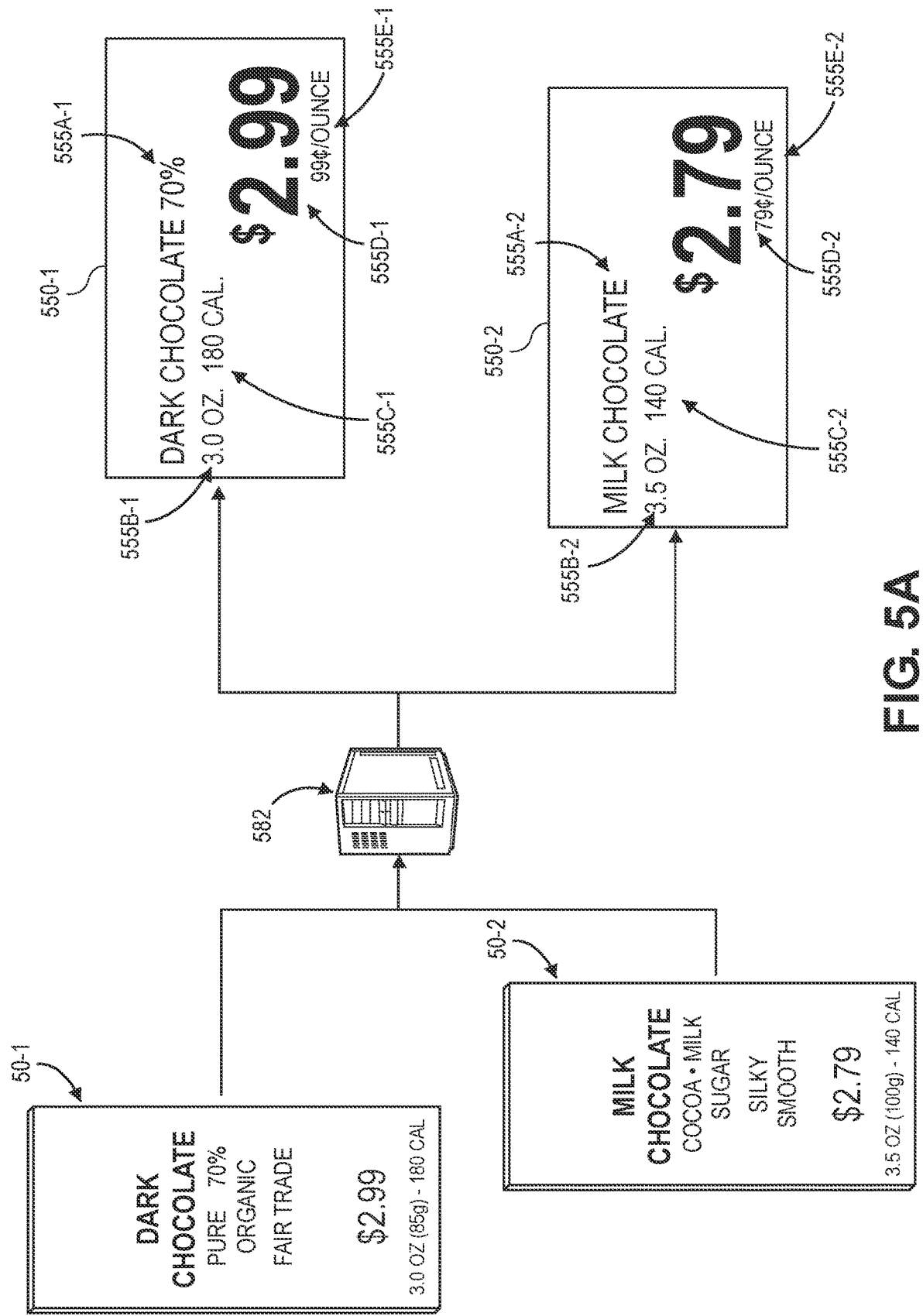
FIGS. 5A through 5F are views of aspects of one system for compressing images in accordance with implementations of the present disclosure.

As is shown in FIG. 5A, a server 582 (e.g., a base station or another computer device or system) generates images 550-1, 550-2 containing information regarding a pair of items 50-1, 50-2, viz., a bar of dark chocolate and a bar of milk chocolate, respectively. The images 550-1, 550-2 of the respective items 50-1, 50-2 may include names 555A-1, 555A-2, masses 555B-1, 555B-2, nutrition information 555C-1, 555C-2, prices 555D-1, 555D-2 and unit prices 555E-1, 555E-2 of the items 50-1, 50-2 in discrete regions of the respective images 550-1, 550-2 that are subsets of the images 550-1, 550-2 and smaller in size than the images 550-1, 550-2 as a whole.

Figure 5B:
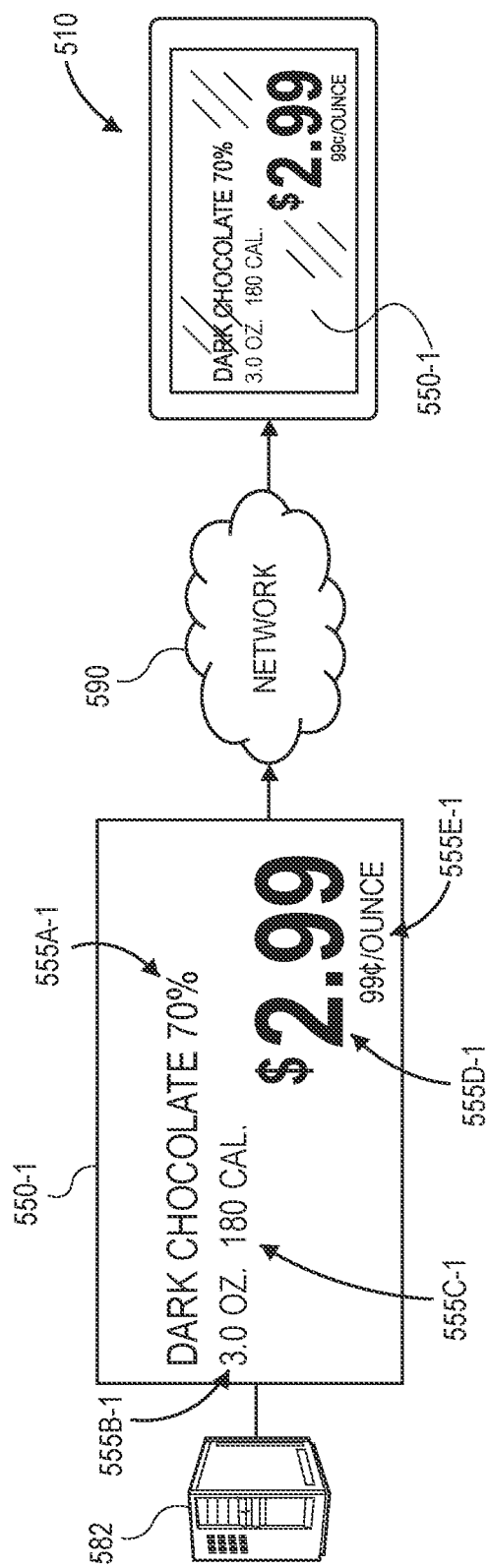
Figure 5C:
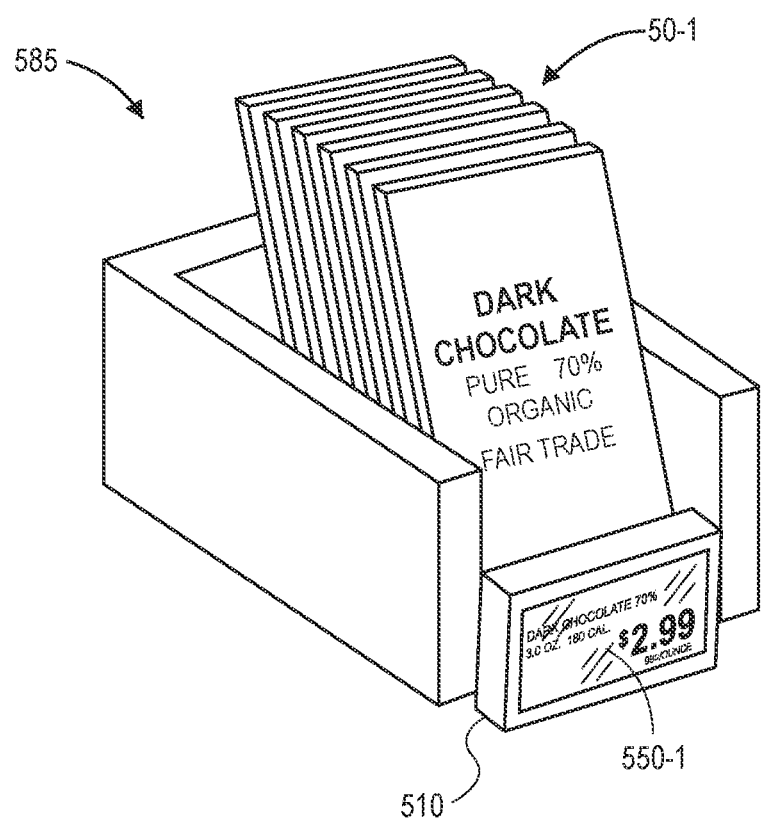

As is shown in FIG. 5B, the server 582 transmits the image 550-1 including information regarding the item 50-1 to an electronic label 510 over one or more networks 590, e.g., according to any wireless protocol. The image 550-1 is displayed by the electronic label 510 on an electronic ink display, or on any other display. As is shown in FIG. 5C, a plurality of items 50-1 is provided within a product space 585 (e.g., a shelf or rack) and made available to customers, and the electronic label 510 is mounted to a front edge of the product space 585, with the image 550-1 displayed thereon.

Figure 5D:
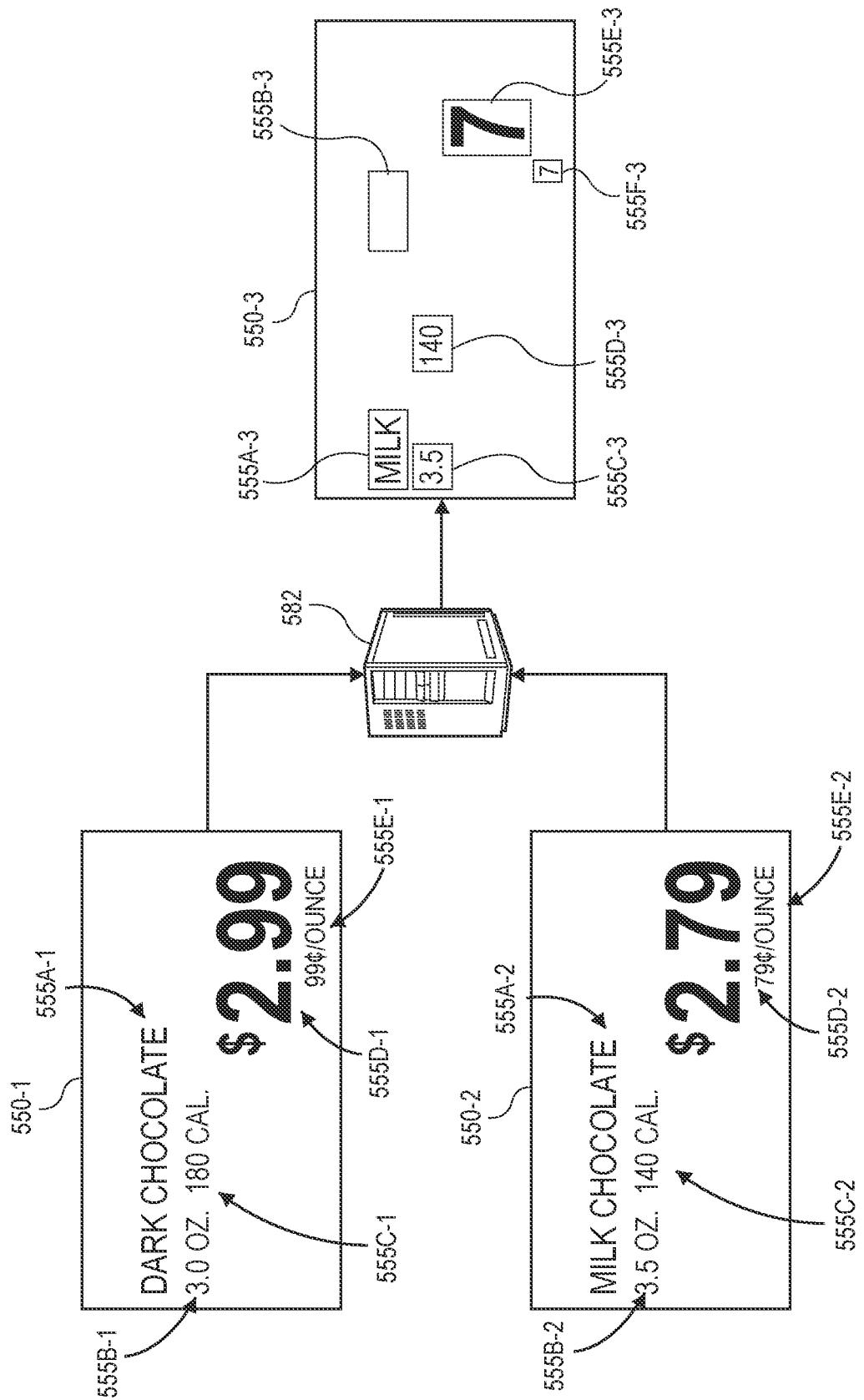

Subsequently, where one or more of the item 50-2 are to be made available to customers at the product space 585, the image 550-1 is compared to the image 550-2 to identify portions of the image 550-2 that depict different information as compared to corresponding portions of the image 550-1. As is shown in FIG. 5D, a difference image 550-3 may be generated between the image 550-2 and the image 550-1, and portions 555A-3, 555B-3, 555C-3, 555D-3, 555E-3, 555F-3 that are depicted within the image 550-2 but not depicted within the image 550-1 may be identified based on the difference image 550-3, such as by applying bounding boxes around locations within the difference image 550-3 corresponding to differences between the image 550-2 and the image 550-1, and selecting the portions 555A-3, 555B-3, 555C-3, 555D-3, 555E-3, 555F-3 within such bounding boxes. For example, as is shown in FIG. 5D, the portion 555A-3 of the image 550-2 depicts the word "milk," which is not depicted in a corresponding portion of the image 550-1. Similarly, the portion 555B-3 of the image 550-2 is blank, where a corresponding portion of the image 550-1 depicts information. The portions 555C-3, 555D-3, 555E-3, 555F-3 depict the numbers "3.5," "140," "7" and "7," which are not depicted in corresponding portions of the image 550-1, and are smaller in size than the image 550-1.

Alternatively, the portions 555A-3, 555B-3, 555C-3, 555D-3, 555E-3, 555F-3 may be identified in any other manner.

Figure 5E:
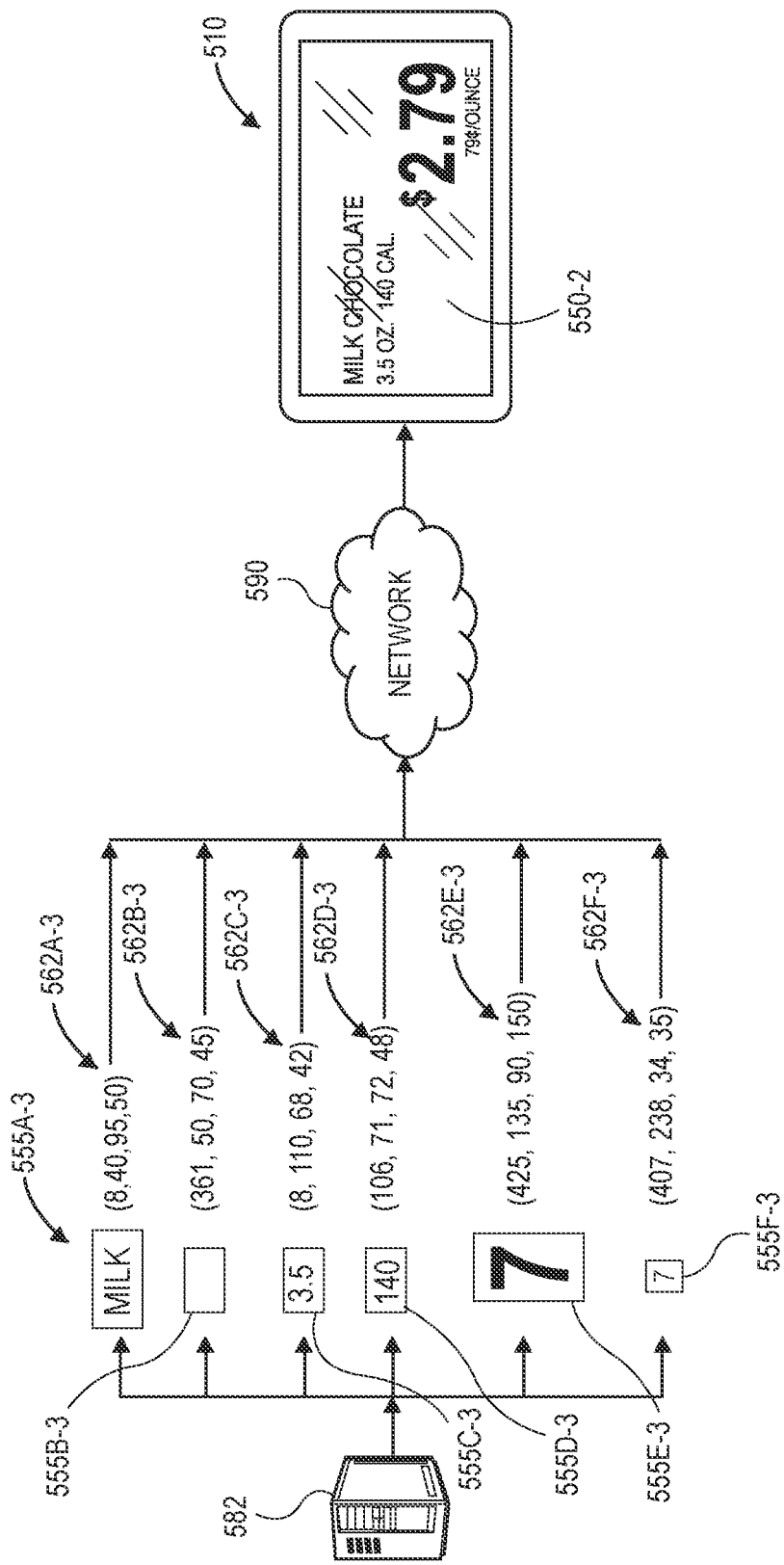

As is shown in FIG. 5E, upon identifying the portions 555A-3, 555B-3, 555C-3, 555D-3, 555E-3, 555F-3, the server 582 transmits each of the portions 555A-3, 555B-3, 555C-3, 555D-3, 555E-3, 555F-3 to the electronic label 510, along with identifiers 562A-3, 562B-3, 562C-3, 562D-3, 562E-3, 562F-3 of locations specified within the image 550-1 corresponding to such portions 555A-3, 555B-3, 555C-3, 555D-3, 555E-3, 555F-3. For example, the identifiers 562A-3, 562B-3, 562C-3, 562D-3, 562E-3, 562F-3 may include (x, y) coordinates or other horizontal and vertical measures of the locations specified within the image 550-1, as well as offsets including specified horizontal or vertical distances from the specified locations. The electronic label 510 may receive the portions 555A-3, 555B-3, 555C-3, 555D-3, 555E-3, 555F-3 and the identifiers 562A-3, 562B-3, 562C-3, 562D-3, 562E-3, 562F-3, and cause the portions 555A-3, 555B-3, 555C-3, 555D-3, 555E-3, 555F-3 to be displayed on the image 550-1 in the locations referenced in the identifiers 562A-3, 562B-3, 562C-3, 562D-3, 562E-3, 562F-3. Because the portions 555A-3, 555B-3, 555C-3, 555D-3, 555E-3, 555F-3 represent differences between the image 550-2 and the image 550-1, displaying the portions 555A-3, 555B-3, 555C-3, 555D-3, 555E-3, 555F-3 on the image 550-1 in locations referenced in the identifiers 562A-3, 562B-3, 562C-3, 562D-3, 562E-3, 562F-3 effectively results in a display of content of the image 550-2 in its entirety by the electronic label 510.

Figure 5F:
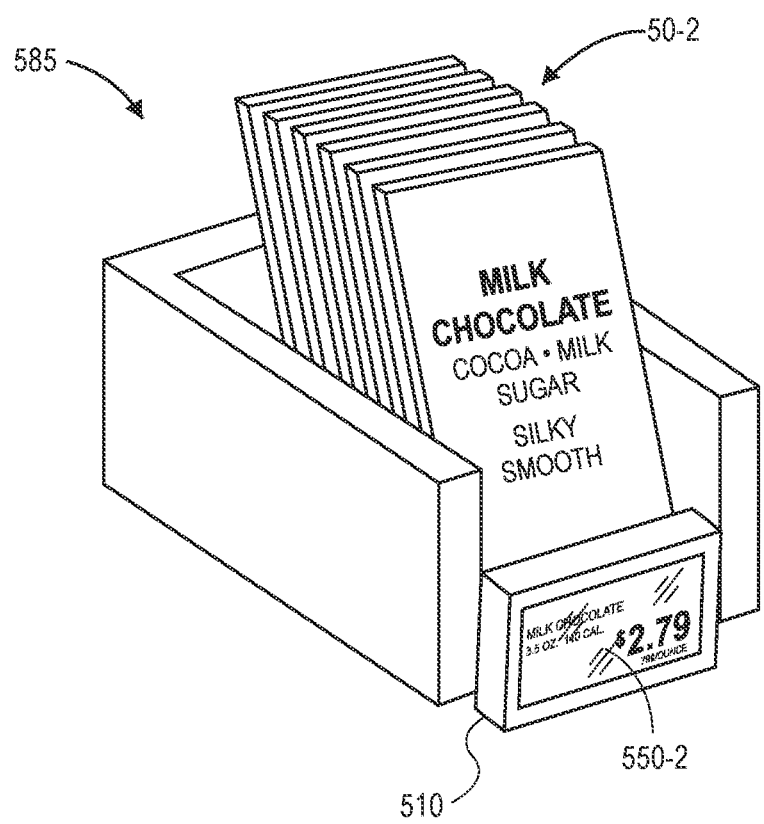

Therefore, as is shown in FIG. 5F, where a plurality of the items 50-2 is subsequently provided within the product space 585 and made available to customers, the image 550-2 depicting the name 555B-1, the mass 555B-2, the nutrition information 555C-2, the price 555D-2 and the unit price 555E-2 of the item 50-2 is displayed on the electronic label 510.

Figure 6:
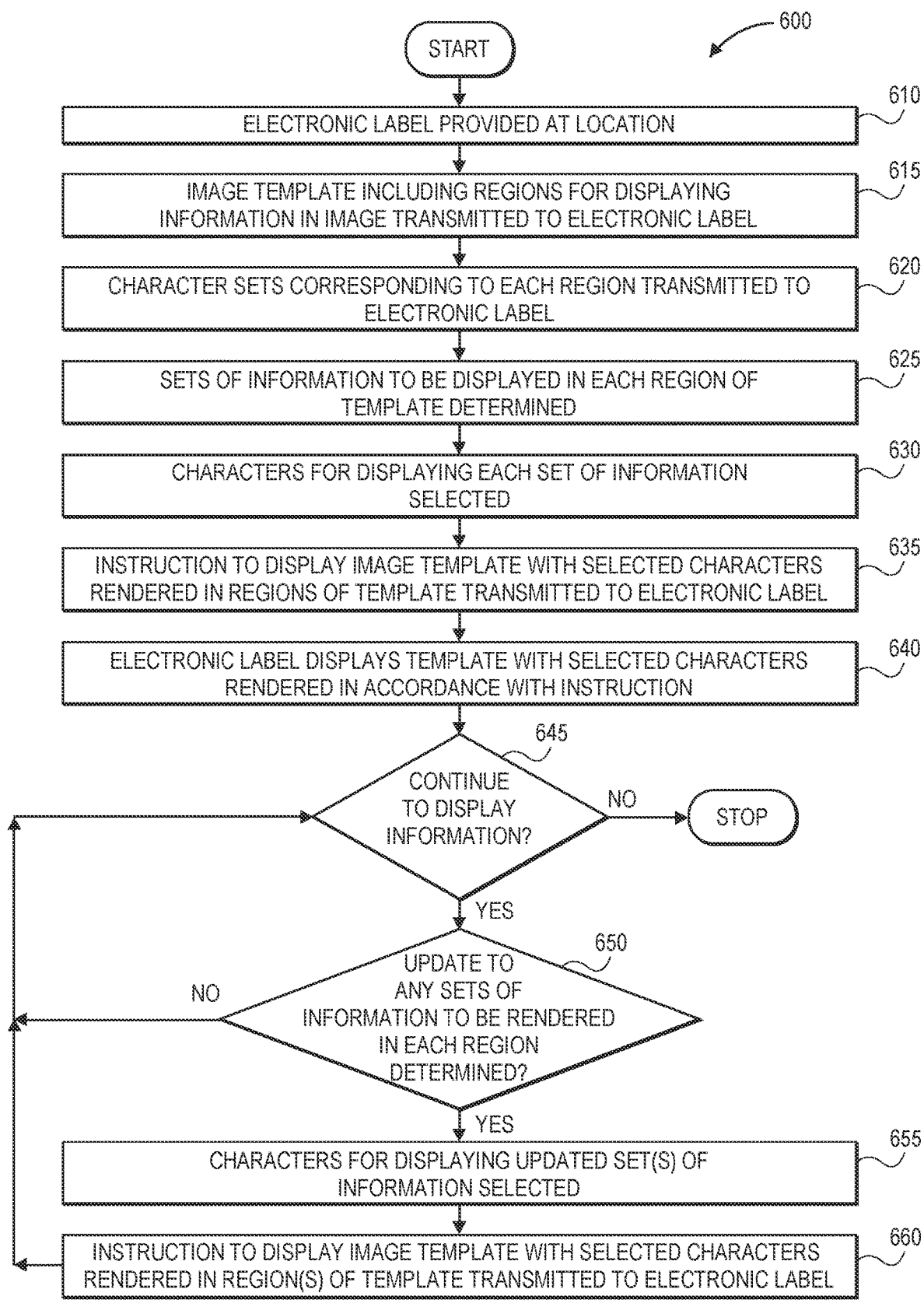
FIG. 6 is a flow chart of one process for compressing images in accordance with implementations of the present disclosure.

Information may be displayed by an electronic label using character sets including images having dimensions corresponding to regions of an image or an image template that are smaller in size than the image or the image template as a whole. Where information is to be displayed by the electronic label within a region of an image or an image template, a string identifying the characters of one or more of the sets representing the information is transmitted to the electronic label, and the characters are displayed within the region based on the string. Referring to FIG. 6, a flow chart of one process for compressing images in accordance with implementations of the present disclosure is shown.

At box 610, an electronic label is provided at a location. The electronic label may be mounted or otherwise provided at the location in any manner, regardless of whether the location is associated with any products.

At box 615, an image template including regions for displaying information in an image is transmitted to the electronic label. For example, the image template may identify regions of the image where information of a specific type or kind is typically displayed. For example, where an electronic label is configured to display images such as the image 250 of FIG. 2B, the image template may identify regions where a banner, a name, a rating, a price, a unit price or other information is typically displayed. In some implementations, the image template may be used to standardize the display of information within an image by an electronic label, or within images by multiple electronic labels. Alternatively, the image template may merely include regions for displaying information of any type or kinds, and such regions need not be standardized across multiple images or multiple electronic labels.

In some implementations, a balance of the image template not including the regions may be blank. In some other implementations, the balance of the image template not including the regions may include text, graphics or other sets of information, which may be static in nature, and may, in some implementations, relate to multiple products or locations and not to any single product or location.

In some implementations, two or more image templates may be transmitted to the electronic label, and such image templates may include regions for displaying information that are provided within common locations of the image templates, or in different locations of the image templates.

At box 620, character sets corresponding to each of the regions are transmitted to the electronic label. For example, the character sets may include letters, numbers, symbols or other characters that may typically be displayed within the regions, and from which any information or data may be constructed or represented therein. For example, the character sets may include numbers 0 through 9, letters A through Z (in uppercase or lowercase), and any symbols, punctuation marks or other characters in selected fonts and having sizes that may be accommodated within one or more of the regions. In some implementations, each of the characters of a character set may have a common height that corresponds to a height of one of the regions of the image template.

At box 625, sets of information to be displayed in each region of the image template are determined, and at box 630, characters for displaying each of the sets of information determined at box 625 are selected. For example, where a proper or common name of a product is to be displayed within a region of an image template, e.g., "Bread" or "Echo Show 10," characters for spelling the proper or common name may be selected from a set of characters corresponding to the region of the image template where the proper or common name is to be displayed. Alternatively, where information of any kind is to be displayed within a region of an image template, characters for spelling the information may be selected from a set of characters corresponding to the region of the image template where the information is to be displayed.

At box 635, an instruction to display the image template with the characters selected at box 630 rendered in the regions of the image template is transmitted to the electronic label. For example, because the image template was transmitted to the electronic label at box 615, and because the character sets were transmitted to the electronic label at box 620, the instruction to display the image template with the characters selected at box 630 may simply include an identifier of the image template, identifiers of regions of the image template, and a string or other list of the characters selected at box 630, in a predetermined order or sequence.

At box 640, the electronic label displays the image template with the selected characters rendered in accordance with the instruction transmitted at box 635.

At box 645, whether the continued display of information is to occur at the location is determined. For example, if information is no longer required or desired at the location, such as where products that were previously offered at the location are no longer offered there, e.g., if the products are no longer available or are out of stock, then the process ends.

If the continued display of information at the location is desired, however, then the process advances to box 650, where whether any updates to any of the sets of information rendered in each region is determined. For example, where the information depicted within the image template relates to a product, a price of the product, a rating of the product, or a status of the product (e.g., a sale or a promotion of the product) represented within the image template and by the selected characters may have changed. Alternatively, where a format in which the information is to be displayed may have changed. For example, where a price of an item was depicted within an image template in a black color or in a first font, and the item has been placed on sale or the price of the item has otherwise been reduced, then displaying the price of the item in a red color or a second font may be desired.

If none of the information are to be updated, however, then the process returns to box 645, where whether the continued display of information is to occur at the location is determined.

If any of the product information has changed, however, then the process advances to box 655, where characters for displaying sets of updated information, e.g., within corresponding regions, are selected.

At box 660, an instruction to display the image template with the characters selected at box 655 rendered in regions of the image template is transmitted to the electronic label. The process then returns to box 645, where whether the continued display of information is to occur at the location is determined is determined.

Figure 7A:
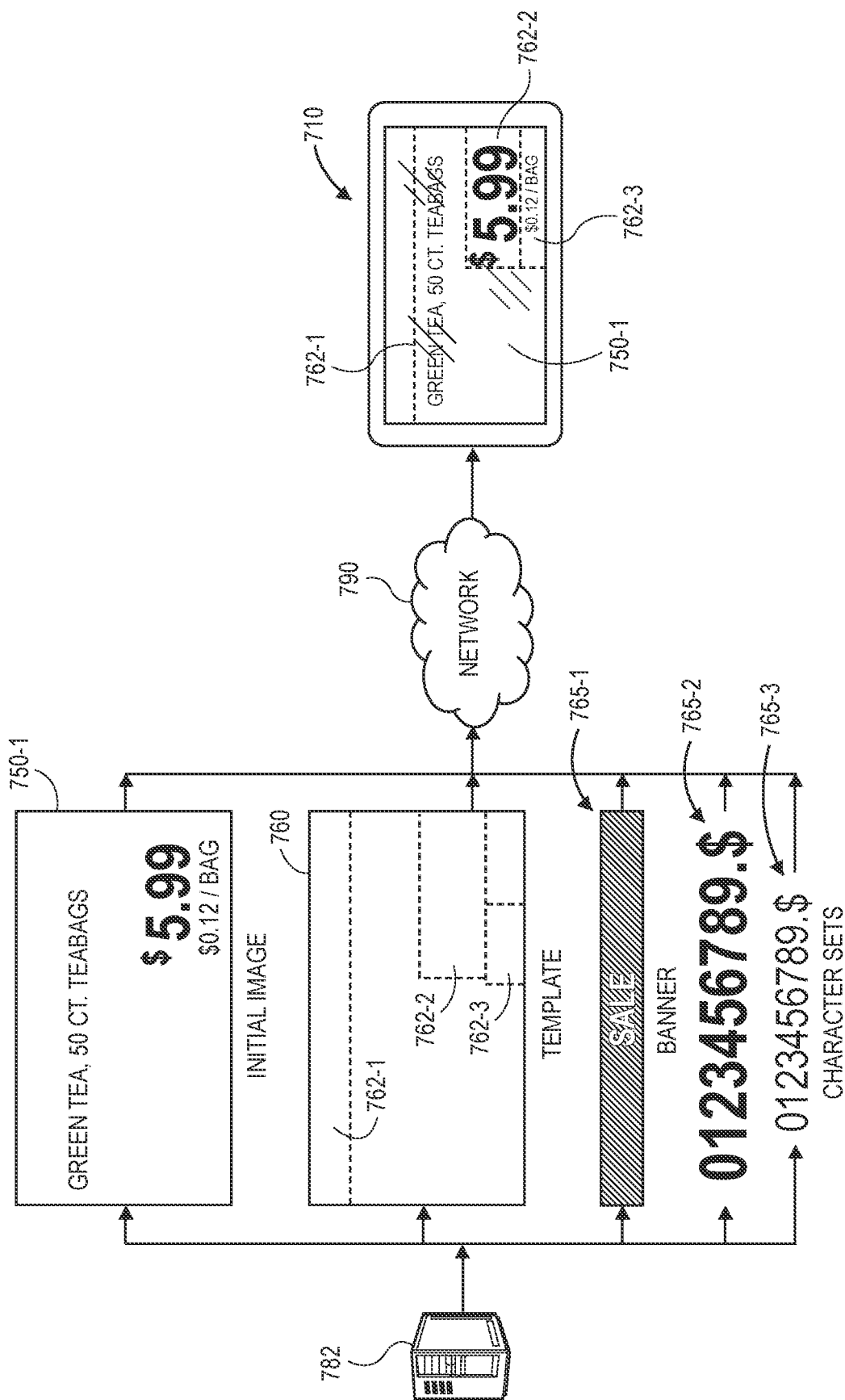
FIGS. 7A and 7B are views of aspects of one system for compressing images in accordance with implementations of the present disclosure.
Figure 7B:
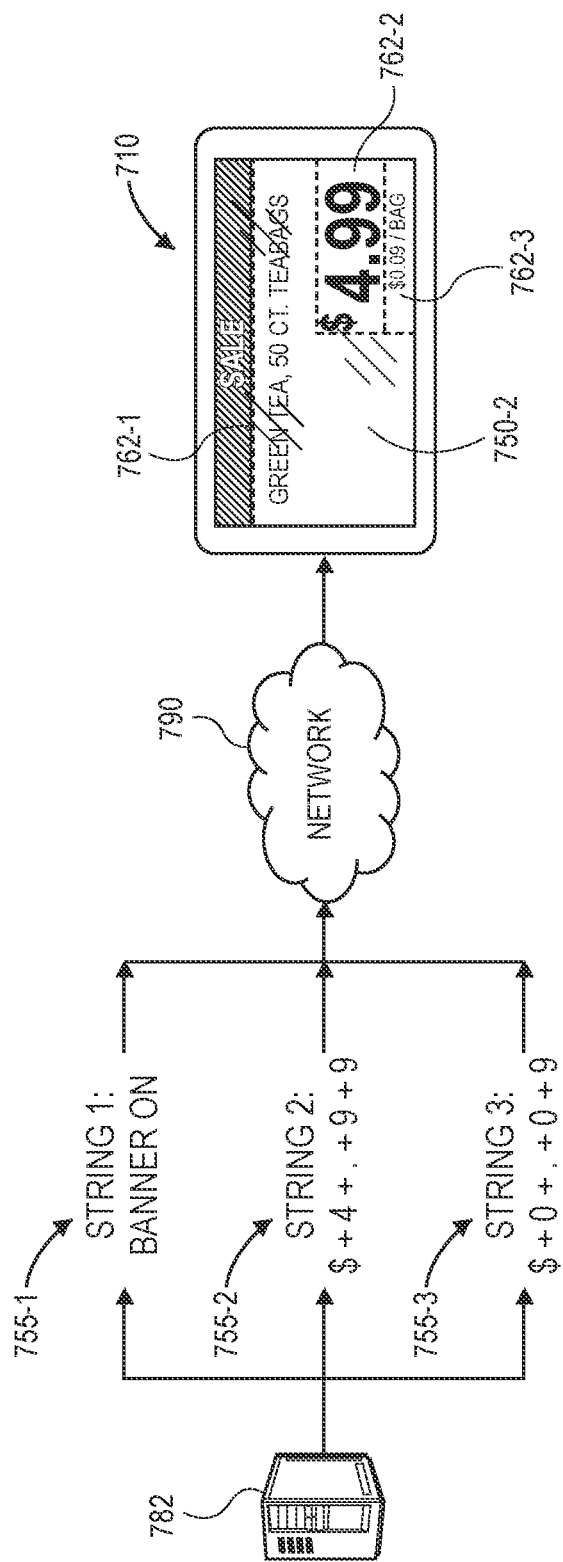

Referring to FIGS. 7A and 7B, views of aspects of one system for compressing images in accordance with implementations of the present disclosure are shown. Except where otherwise noted, reference numerals preceded by the number "7" shown in FIGS. 7A and 7B indicate components or features that are similar to components or features having reference numerals preceded by the number "5" shown in FIGS. 5A through 5F, by the number "3" shown in FIG. 3A or 3B, by the number "2" shown in FIG. 2A or 2B or by the number "1" shown in FIGS. 1A through 1F.

As is shown in FIG. 7A, an electronic label 710 receives a plurality of data from a server 782 (e.g., a base station or another external system) over one or more networks 790, e.g., according to any wireless protocol. The data transmitted to the electronic label 710 includes an initial image 750-1, a template 760 having a predetermined number of regions 762-1, 762-2, 762-3 for displaying information within the template 760, a banner 765-1, and character sets 765-2, 765-3. The regions 762-1, 762-2, 762-3 are subsets of the template 760 and are smaller in size than the image 750-1 as a whole.

The initial image 750-1 includes information regarding an item, viz., a fifty-count box of green tea teabags. The initial image 750-1 does not depict any information within a location corresponding to the region 762-1 of the template 760. The initial image 750-1 further includes a price of the item, and a unit price of the item, depicted in locations corresponding to the regions 762-2, 762-3 of the template 760.

The banner 765-1 is sized for display within the region 762-1 of the template 760, and includes an indication of a sale (or another promotion) relating to an item. The set of characters 765-2 includes numbers and symbols in sizes and fonts consistent with the price of the item depicted within the initial image 750-1, and having dimensions corresponding to dimensions of the region 762-2 of the template 760. Likewise, the set of characters 765-3 includes numbers and symbols in sizes and fonts consistent with the unit price of the item depicted within the initial image 750-1, and having dimensions corresponding to dimensions of the region 762-3 of the template 760.

Alternatively, any other information or data may be transmitted to the electronic label 710 over the one or more networks 790, together with the initial image 750-1 or separately.

Where information within the initial image 750-1 is no longer relevant or requires revision, instructions for displaying relevant information may be provided to the electronic label 710, such as an indication that the banner 765-1 is to be displayed within the region 762-1, or indications that relevant ones of the sets of characters 765-2, 765-3 are to be displayed within the regions 762-2, 762-3. For example, as is shown in FIG. 7B, a string 755-1 indicating that the banner 765-1 is to be displayed within the region 762-1 is transmitted by the server 782 to the electronic label 710 over the one or more networks. Thus, rather than transmitting an entire new image or the banner 765-1 to the electronic label 710, a string identifying the banner 765-1 and the region 762-1 may be transmitted to the electronic label 710, thereby limiting an amount of data that must be transmitted to cause the banner 765-1 to be displayed within the region 762-1.

Similarly, as is also shown in FIG. 7B, a string 755-2 indicating a new price that is to be displayed within the region 762-2 is transmitted to the electronic label 710. The string 755-2 identifies the respective characters of the set of characters 765-2 that must be displayed within the region 762-2 in order to cause the new price to be displayed on the electronic label 710. Likewise, a string 755-3 indicating a new unit price that is to be displayed within the region 762-3 is transmitted to the electronic label 710. The string 755-3 identifies the respective characters of the set of characters 765-3 that must be displayed within the region 762-3 in order to cause the new unit price to be displayed on the electronic label 710. Thus, rather than transmitting an entire new image with the new price and the new unit price depicted therein, or portions of images depicting the new price and the new unit price, to the electronic label 710, the string 755-2 and the string 755-3 may be transmitted to the electronic label 710 to cause the new price and new unit price to be displayed within the regions 762-2, 762-3.

Figure 8:
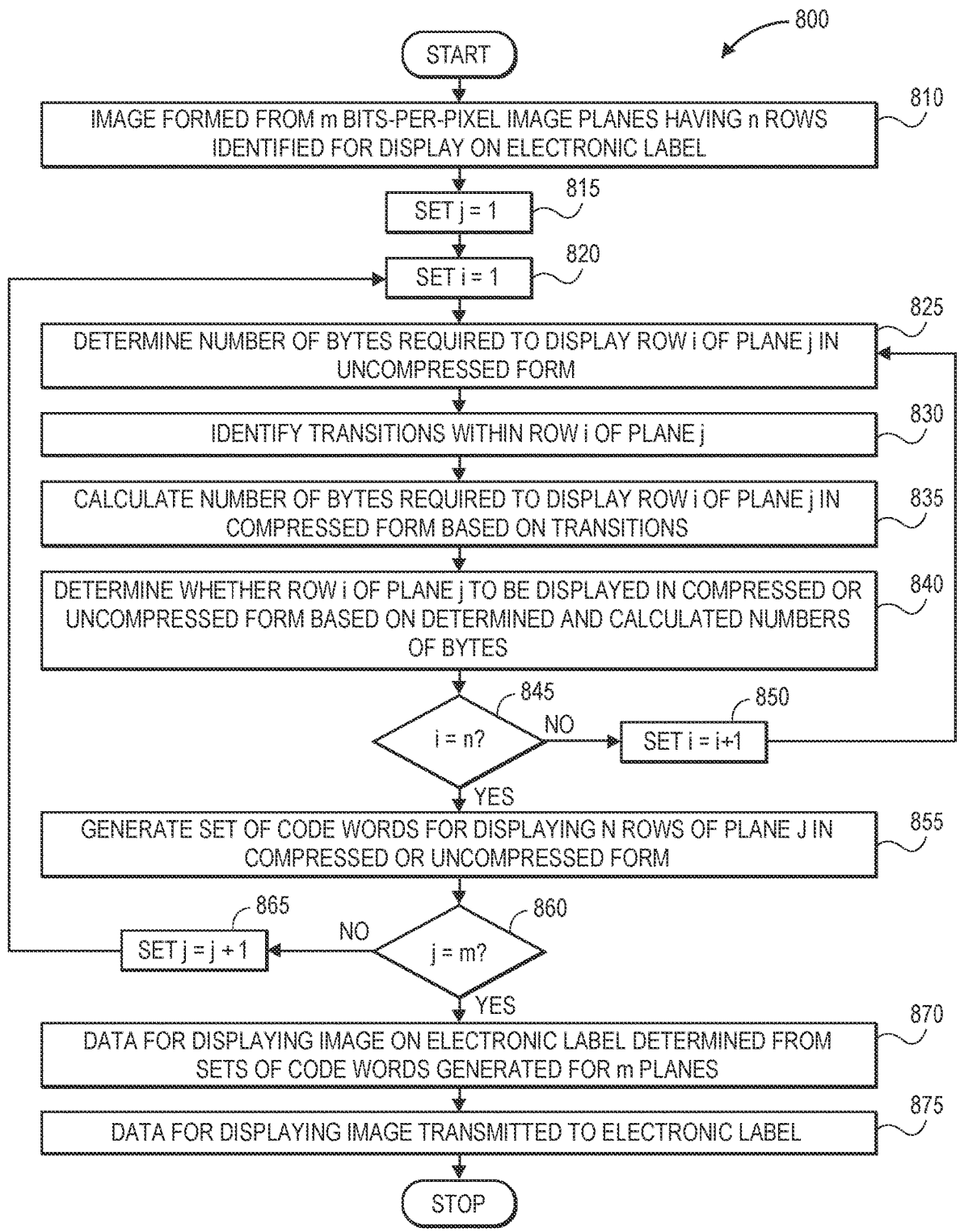
FIG. 8 is a flow chart of one process for compressing images in accordance with implementations of the present disclosure.

In some implementations, a run-length-encoding analysis may be utilized to express colors that are to be depicted within an electronic image to be displayed by an electronic label. Run-length-encoding implementations may be particularly useful for use in electronic labels, which may typically feature substantially small, low-power processors, and write data into memory at defined offsets, but do not perform any complex computations. Referring to FIG. 8, a flow chart of one process for compressing images in accordance with implementations of the present disclosure is shown.

At box 810, an image formed from m bits-per-pixel image planes and having n rows is identified for display on an electronic label. For example, where the image is a two bit-per-pixel image, viz., with two image planes each having pixels that may represent one of two colors, thereby enabling each pixel of the image to represent one of four colors, a value of m is equal to two. Additionally, where the image has dimensions such as 296 pixels by 152 pixels (viz., pixels in 296 columns and 152 rows), a value of n is equal to 152.

At box 815, a value of a step variable j corresponding to the number of bits-per-pixel of the image planes is set equal to one, or j=1. At box 820, a value of a step variable i corresponding to the number of rows is set equal to one, or i=1.

At box 825, a number of bytes required to display the row i of the plane j of the image in an uncompressed form is determined. For example, where each pixel of an image plane may be represented in a single bit, by values of 0 or 1 each corresponding to one of a pair of colors, eight of such pixels may be represented in a single byte in an uncompressed form. Thus, where an image has dimensions of 224 pixels by 168 pixels (viz., 168 rows of 224 pixels), each row of 224 pixels may be represented in an uncompressed form by twenty-eight bytes, or a total of 224 bits.

At box 830, transitions within the row i of the plane j are identified. A transition occurs when a color of one pixel within the row i is different from a color of an adjacent pixel within the row i. For example, where each row of an image plane has ninety-six pixels, the row may have as many as ninety-five transitions, e.g., where the pixels alternate in color across the entire row, or as few as zero transitions, e.g., where each of the pixels of the entire row is a common color.

In some implementations, a run-length encoding analysis may be used to determine a number of transitions within the row i. The run-length encoding analysis may determine whether any transitions from white to black (or red to black, or any color to any other color) are present within the row i of the plane. Indications of such transitions and their respective row counts may be stored within a spreadsheet, an array, or another file or record, along with an initial color of the row i. The run-length encoding analysis may further determine a number of pixels between each of the transitions. Moreover, where a number of pixels between transitions spans across multiple rows, the run-length encoding analysis may determine a number of rows (e.g., a row count) between such transitions.

In some implementations, a run-length encoding analysis may be performed based on each of the n rows within the plane j as a whole, rather than individually, and records of transitions and/or row counts for each of the n rows may be generated and stored within a spreadsheet, an array, or another file or record.

At box 835, a number of bytes required to display the row i of the plane j in a compressed form is calculated based on the transitions identified at box 830. For example, based on a number of the transitions within the row i, a number of bytes required to represent the row i including data representing colors of the row i, and pixel or row counts, may be generated for each common color. Where the row i of the plane j is a single color, the number of bytes required to display the row i may be one, e.g., a single-byte code word identifying the row number and the color. Moreover, where the row i of the plane j is a single color, and that color is the same as the color of the previous row, viz., the row i−1, the row i of the plane j may be expressed without requiring any additional bytes, such as by modifying the single-byte code word of the previous row, viz., the row i−1, to indicate that the row i has the same color. Where the row i of the plane j includes pixels of multiple colors, each marked by a transition, the number of bytes required to display the row i may be determined based on an amount of data required to represent identifiers of a first pixel having the color, the color, and the number of pixels having that color.

In some implementations, a single-byte code word includes a predetermined number of bits for identifying an initial pixel or row and a color, and a predetermined number of bits for identifying a number of transitions or rows. For example, where the single-byte code word designates five or six bits for identifying numbers of rows, the single-byte code word may be used to indicate that up to thirty-two consecutive pixels or rows (viz., for five bits) or sixty-four consecutive pixels or rows (viz., for six bits) is of a common color. If an image to be displayed by an electronic label contains more consecutive transitions or rows of a common color than may be accommodated within a single-byte code word, multiple single-byte code words may be provided. For example, where one hundred pixels or rows are to be depicted within an image in series, one single-byte code word may indicate that sixty-three pixels or rows are to be depicted within the image, and another single-byte code word may indicate that thirty-seven pixels or rows are to be depicted following the sixty-three pixels or rows.

At box 840, whether the row i of the plane j is to be displayed in an uncompressed form or a compressed form is determined based on the number of bytes determined at box 825 and the number of bytes calculated at box 835. For example, where data in the uncompressed form for displaying the row i would be equal in amount or smaller than data in the compressed form for displaying the row i, such that compression would not provide any reduction in data, the row i may be displayed in the uncompressed form. Where data in the uncompressed form for displaying the row i would be greater than data in the compressed form for displaying the row i, the row i may be displayed in the compressed form.

At box 845, whether a value of the step variable i is equal to n, or i=n, is determined.

If the value of the step variable i is not equal to n, or i≠n, then the process advances to box 850, where the value of the step variable i is incremented by one, or set equal to i+1, before returning to box 825, where a number of bytes required to display the row i of the plane j of the image in an uncompressed form is determined.

If the value of the step variable i is equal to n, or i=n, then the process advances to box 855, where a set of code words is generated for displaying each of the n rows of the plane j in an uncompressed form or a compressed form. For example, where a row is to be displayed in an uncompressed form, code words may identify colors of pixels, e.g., white, black, red, or another color, and counts of the pixels to be displayed within the row in the uncompressed form. Where a row is to be displayed in a compressed form, one or more code words may identify a color and a pixel count or a row count for each of the pixels having the color. Where a row is to be displayed in the same color as an adjacent row, a code word for depicting the adjacent row may be updated to indicate that the row is also to be displayed in the compressed form in that color.

At box 860, where whether a value of the step variable j is equal to m, or j=m, is determined.

If the value of the step variable j is not equal to m, or j≠m, then the process advances to box 865, where the value of the step variable j is incremented by one, or set equal to j+1, before returning to box 820, where a value of a step variable i is set equal to one, or i=1, and to box 825, where a number of bytes required to display the row i of the plane j of the image in an uncompressed form is determined.

If the value of the step variable j is equal to m, however, then the process advances to box 870, where data for displaying the image on the electronic label is determined from the sets of code words generated for the m planes. At box 875, the data for displaying the image is transmitted to the electronic label, and the process ends.

Referring to FIGS. 9A through 9D, views of aspects of one system for compressing images in accordance with implementations of the present disclosure are shown. Except where otherwise noted, reference numerals preceded by the number "9" shown in FIGS. 9A through 9D indicate components or features that are similar to components or features having reference numerals preceded by the number "7" shown in FIGS. 7A and 7B, by the number "5" shown in FIGS. 5A through 5F, by the number "3" shown in FIG. 3A or 3B, by the number "2" shown in FIG. 2A or 2B or by the number "1" shown in FIGS. 1A through 1F.

Figure 9A:
FIGS. 9A through 9D are views of aspects of one system for compressing images in accordance with implementations of the present disclosure.

As is shown in FIG. 9A, an image 950 to be displayed by an electronic label is shown. The image 950 depicts information, viz., a set of letters 955-1, 955-2, 955-3, 955-4, in a single plane having a pair of colors, such as black and white, or any other pair of colors. Alternatively, the image 950 may depict information in multiple planes, each having a corresponding pair of colors.

Figure 9B:
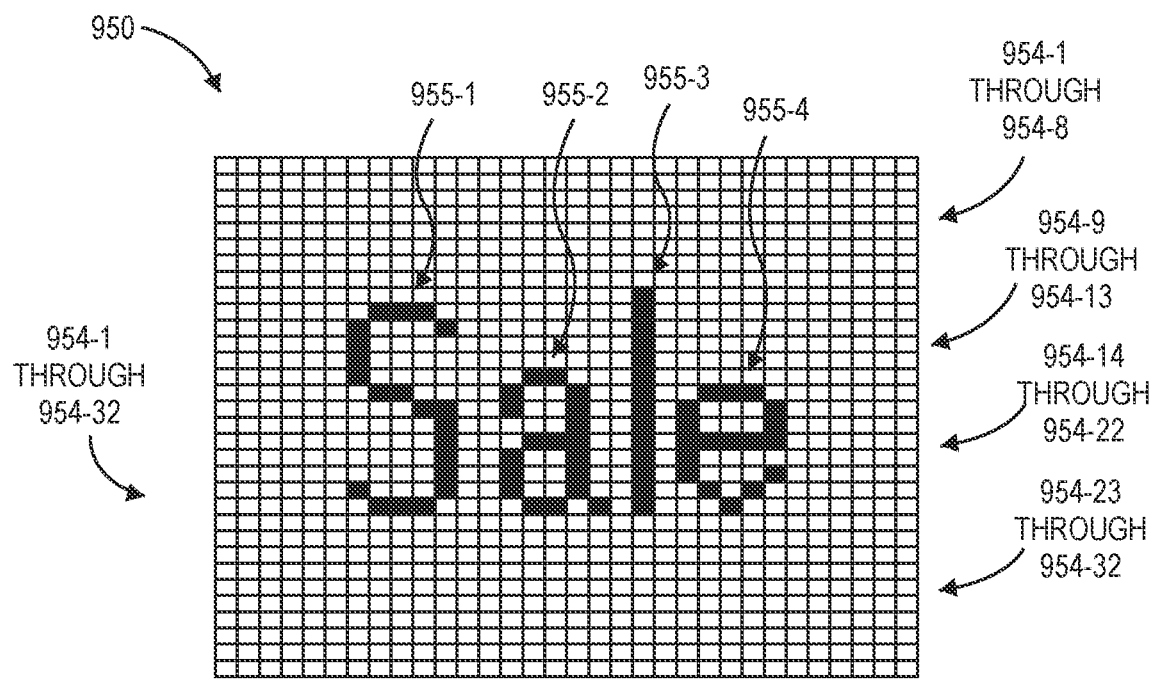
Figure 9C:
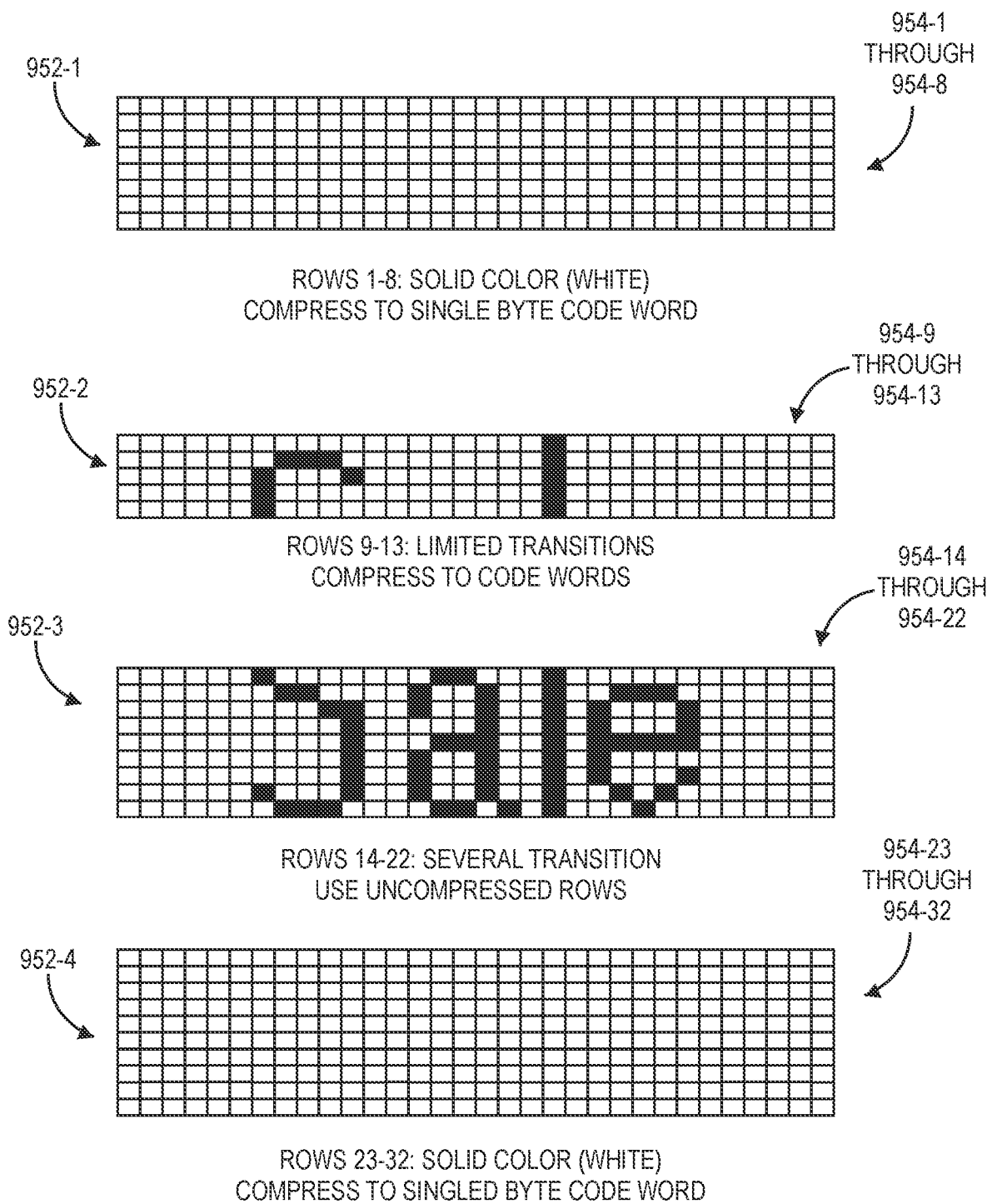

As is shown in FIGS. 9B and 9C, the image 950 is displayed with a grid identifying pixels of the image 950, which are arranged in thirty-two rows 954-1 through 954-32. The grid identifies a subset 952-1 of the pixels 954-1 through 954-8 that do not include any of the letters 955-1, 955-2, 955-3, 955-4, and thereby do not include any transitions, as such pixels 954-1 through 954-8 have a common color. The grid further identifies another subset 952-2 of the pixels 954-9 through 954-13 including portions of the letters 955-1 and 955-2, thereby including a small number of transitions from one color to another, which may be determined according to a run-length encoding analysis or in any other manner. The grid also identifies yet another subset 952-3 of the pixels 954-14 through 954-22 including portions of each of the letters 955-1, 955-2, 955-3, 955-4, and a large number of transitions from one color to another, which may also be determined according to a run-length encoding analysis or in any other manner. Finally, the grid also identifies yet another subset 952-4 of the pixels 954-23 through 954-32 that do not include any of the letters 955-1, 955-2, 955-3, 955-4, and thereby do not include any transitions, as each of such pixels 954-23 through 954-32 have a common color.

As is shown in FIG. 9C, because each of the pixels of the eight rows 954-1 through 954-8 of the subset 952-1 is of a common color, viz., white, data for displaying the eight rows may be compressed to a single-byte code word. For example, a single byte may include a pair of bits indicating that the rows are of a common color, a bit identifying the color (viz., one of black or white, or any other pair of colors), as well as bits identifying a number of rows having the common color. Because the pixels of the four rows 954-9 through 954-13 of the subset 952-2 include limited transitions, e.g., from white pixels to black pixels of portions of the letters 955-1, 955-3, and back to white pixels, data for displaying the five rows may be compressed to code words for pixels between each of such transitions, including a pair of bits identifying the colors of the pixels and a number or count of the pixels having that color. A number of bytes required to represent the pixels of the subset 952-2 may be determined based on a number of the transitions.

As is further shown in FIG. 9C, because the pixels of the nine rows 954-14 through 954-22 of the subset 952-3 include extensive transitions, e.g., from white pixels to black pixels of portions of the letters 955-1, 955-2, 955-3, 955-4, and back to white pixels, data for displaying the five rows need not be compressed. A number of bytes required to represent the pixels of the subset 952-3 may be determined based on a number of rows of the subset 952-3, viz., nine, and a number of pixels in each of such rows, viz., thirty-two, or a total of thirty-six bytes, with each byte including data for representing colors of eight pixels. Finally, as with the subset 952-1, because each of the pixels of the ten rows 954-23 through 954-32 of the subset 952-4 is of a common color, viz., white, data for displaying the ten rows may be compressed to a single-byte code word including a pair of bits indicating that the rows are of a common color, a bit identifying the color (viz., white), as well as bits identifying a number of rows having the common color (viz., ten).

Figure 9D:
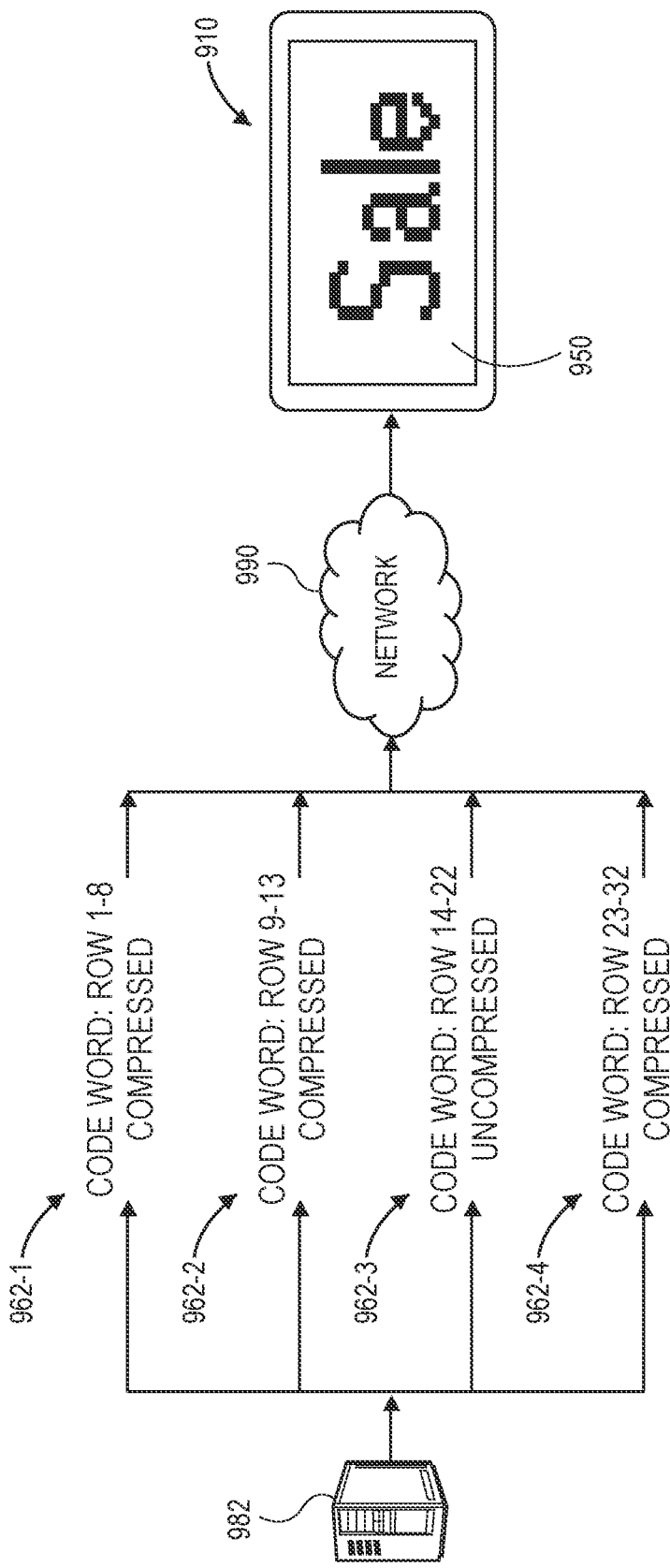

As is shown in FIG. 9D, in order to display the image 950 on a display of an electronic label 910, a base station 982 or another computer device or system generates code words 962-1, 962-2, 962-3, 962-4 based on the transitions of each of the subsets 952-1, 952-2, 952-3, 952-4 and transmits the code words 962-1, 962-2, 962-3, 962-4 to the electronic label 910 over the one or more networks 990. The code words 962-1 include a single-byte code word for representing the rows 954-1 through 954-8 in a compressed form, while the code words 962-2 include a plurality of bytes for representing the rows 954-9 through 954-13 in compressed form, the code words 962-3 include code words for representing the rows 954-14 through 954-22 in uncompressed form, and the code words 962-4 include a single-byte code word for representing the rows 954-23 through 954-32 in a compressed form. The electronic label 910 may be programmed or configured to interpret the code words 962-1, 962-2, 962-3, 962-4 to cause the image 950 to be displayed by the electronic label 910.

Although some of the implementations disclosed herein reference the display of images on electronic labels associated with shelves or other product spaces, the systems and methods of the present disclosure are not so limited. Furthermore, although some of the implementations disclosed herein reference detecting events in a commercial setting, e.g., within a materials handling facility such as a fulfillment center or a retail establishment, the systems and methods of the present disclosure are likewise not so limited. Rather, the systems and methods disclosed herein may be utilized to detect events of any type or kind. For example, one or more of the systems disclosed herein may be provided as electronic signs on which labels may be displayed. Such signs may be provided at gas stations (e.g., to indicate prices per gallon or overall prices or gallons pumped), conference rooms (e.g., to identify contents of the rooms or purposes for which such rooms may be reserved), or in any other location, and images depicting relevant information may be displayed. Where the information depicted within such images requires replacement or revision, for any reason, images or portions thereof may be modified according to one or more of the methods described herein for electronic labels.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Additionally, it should also be appreciated that the detailed description is set forth with reference to the accompanying figures. In the figures, the use of the same reference numbers in different figures indicates similar or identical items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Moreover, with respect to the one or more methods or processes of the present disclosure shown or described herein, including but not limited to the flow charts shown in FIG. 4, 6, or 8, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:
1. A system comprising:
   a base station having at least one data store and at least one computer processor;
   a plurality of electronic labels, wherein each of the plurality of electronic labels comprises a display, a battery, a housing, a memory component, a processor, and a transceiver provided within a housing, and wherein each of the plurality of electronic labels is in communication with the base station over one or more networks,
   wherein the base station is programmed with one or more sets of instructions that, when executed by the at least one computer processor of the base station, cause the base station to at least:
      determine first information regarding a first product, wherein the first information comprises a first plurality of characters in a first sequence;
      generate a first image depicting the first information in a first region of the first image, wherein the first region is a subset of the first image;

transmit the first image to at least a first electronic label of the plurality of electronic labels, wherein the first electronic label is provided in association with the first product;

transmit a first set of characters to at least the first electronic label, wherein each of the first set of characters is an image having at least one dimension in common with at least one dimension of the first region of the first image, and wherein each of the first plurality of characters is one of the first set of characters;

transmit a first instruction to display at least the first image to the first electronic label;

identify second information regarding one of the first product or a second product, wherein the second information comprises a second plurality of characters in a second sequence, and wherein each of the second plurality of characters is one of the first set of characters;

generate a string identifying the second plurality of characters in the second sequence; and transmit a second instruction to display the second plurality of characters identified in the string in the first region of the first image according to a bit block transfer technique to the first electronic label, wherein the second instruction comprises the string.

2. The system of claim 1, wherein the first product is one of:
a first baked food;
a first beverage;
a first canned good;
a first frozen food;
a first prepared food;
a first sandwich; or
a first snack food, and
wherein the second product is one of:
a second baked food;
a second beverage;
a second canned good;
a second frozen food;
a second prepared food;
a second sandwich; or
a second snack food.

3. The system of claim 1, wherein the first image comprises a plurality of pixels, and
wherein colors of each of the plurality of pixels are represented by one of two bits.

4. The system of claim 1, wherein each of the displays of the plurality of electronic labels is an electronic ink display.

5. A method comprising:
transmitting, by a computer system to an electronic label over one or more networks, at least a first image for display by the electronic label, wherein a first portion of the first image depicts first information, wherein the first information comprises a first plurality of characters in a first sequence, and wherein the first portion is a subset of the first image;

transmitting, by the computer system to the electronic label, at least a first set of characters, wherein each of the first set of characters is an image having at least one dimension in common with at least one dimension of the first portion of the first image, and wherein each one of the first plurality of characters is one of the first set of characters;

causing, by the electronic label, the first image to be displayed on a display of the electronic label;

identifying, by the computer system, second information comprising a second plurality of characters in a second sequence, and wherein each of the second plurality of characters is one of the first set of characters;

transmitting, by the first computer system to the electronic label over the one or more networks, a string identifying the second plurality of characters in the second sequence;

transmitting, by the first computer system to the electronic label over the one or more networks, at least an instruction to display at least the second information in the first portion of the first image, wherein the instruction comprises a string identifying the second plurality of characters in the second sequence;

receiving, by the electronic label, at least the instruction to display at least the second information in the first portion of the first image; and causing, by the electronic label, the second plurality of characters to be displayed in the first portion of the first image in the second sequence in accordance with a bit block transfer technique in response to receiving the instruction.

6. The method of claim 5, wherein the first information comprises at least one of:
a name of a first item;
a first price of the first item; or
a first rating of the first item, and
wherein the second information comprises at least one of:
a name of a second item;
a second price of one of the first item or the second item; or
a second rating of one of the first item or the second item.

7. The method of claim 5, wherein the electronic label is provided in association with a product space,
wherein the first image is caused to be displayed on the display of the electronic label at a first time,
wherein at least one of a first item or a second item is associated with the location at the first time,
wherein the second plurality of characters is caused to be displayed on the display of the electronic label at a second time, and
wherein at least one of the first item or the second item is associated with the location at the second time.

8. The method of claim 5, wherein the first image comprises a plurality of pixels, and
wherein colors of each of the plurality of pixels are represented by one of two bits.

9. The method of claim 5, wherein transmitting at least the instruction to display at least the second image in the first portion of the first image comprises:
transmitting, by the first computer to the electronic label over the one or more networks,
an identifier of a location of the first portion of the first image; and
the instruction to display at least the second information in the first portion of the first image.

10. The method of claim 9, wherein the identifier of the location of the first portion of the first image comprises:
a position of at least one corner of the first portion of the first image;
a horizontal offset from at least one corner of the first image; and
a vertical offset from the at least one corner of the first image.

11. The method of claim 5, wherein the first plurality of characters in the first sequence represents one of a name of a first item, a first price of the first item, or a first rating of the first item, and wherein the second plurality of characters in the second sequence represents one of a name of a second item, a second price of one of the first item or the second item, or a second rating of one of the first item or the second item.

12. The method of claim 5, wherein the first item is one of:

a first baked food;
a first beverage;
a first canned good;
a first frozen food;
a first prepared food;
a first sandwich; or
a first snack food, and wherein the second item is one of:

a second baked food;
a second beverage;
a second canned good;
a second frozen food;
a second prepared food;
a second sandwich; or
a second snack food.

13. The method of claim 5, wherein identifying the second plurality of characters comprises:

identifying a second image, wherein the second image depicts the second information in a second portion of the second image, wherein the second portion of the second image corresponds to the first portion of the first image;

generating a difference image between the first image and the second image, wherein the second plurality of characters is identified based at least in part on the difference image.

14. The method of claim 5, wherein transmitting at least the first image by the computer system to the electronic label over the one or more networks comprises:

transmitting at least a first code word and a second code word comprising data representing the first image by the computer system to the electronic label over the one or more networks, wherein the first code word identifies at least a first row of the first image and a color associated with the first row, and wherein the second code word identifies at least one pixel of a second row of the first image and a color associated with the at least one pixel of the second row, and wherein transmitting at least the instruction to display at least the second plurality of characters in the first portion of the first image comprises:

transmitting at least a third code word and a fourth code word comprising data representing a second image depicting the second information by the computer system to the electronic label over the one or more networks, wherein the third code word identifies at least a third row of the second image and a color associated with the third row, and wherein the fourth code word identifies at least one pixel of a fourth row of the second image and a color associated with the at least one pixel of the fourth row.

15. The method of claim 5, wherein the electronic label comprises the display, a battery, a housing, a memory component, a processor, and a transceiver, and wherein each of the display, the battery, the memory component, the processor and the transceiver is provided within the housing.

16. The method of claim 15, wherein the display is an electronic ink display.

17. A system comprising:

a display;
a housing;
a battery;
a memory component;
a transceiver; and
at least one processor, wherein the system is configured to at least:

receive a first image over one or more networks, wherein a first portion of the first image depicts first information regarding a first item in a first region of the first image, wherein the first region is a subset of the first image, and wherein the first information comprises a first plurality of characters in a first sequence, wherein the first plurality of characters in the first sequence represents one of a name of the first item, a first price of the first item, or a first rating of the first item;

cause the first image to be displayed;

receive a first set of characters, wherein each of the first set of characters is an image having at least one dimension in common with the first region of the first image;

identify second information regarding at least one of the first item or a second item, wherein the second information represents one of a name of the second item, a second price of one of the first item or the second item, or a second rating of one of the first item or the second item;

receive a string identifying a second plurality of characters in a second sequence, wherein each of the second plurality of characters is one of the first set of characters, and wherein the second image is one of the second plurality of characters, and wherein the second plurality of characters in the second sequence represents the second information, and cause the second plurality of characters to be displayed in the second sequence in the first region of the first image according to a bit block transfer technique.

18. The system of claim 17, wherein the system is provided in association with a product space, wherein the first image is caused to be displayed on the display at a first time, wherein at least one of the first item is associated with the location at the first time, wherein at least the second plurality of characters is caused to be displayed on the display at a second time, and wherein at least one of the second item is associated with the location at the second time.

19. The system of claim 17, wherein the system is further configured to at least:

receive at least the second image, an identifier of a location of the first image, and an instruction to display the second image in the first region of the first image, wherein the identifier of the location of the first region of the first image comprises:

a position of at least one option of the first region of the first image;

a horizontal offset from the position corresponding to the first region of the first image; and a vertical offset from the position corresponding to the first region of the first image.

20. The system of claim 17, wherein the system is further configured to at least:
receive at least a first code word and a second code word comprising data representing the first image over the one or more networks, wherein the first code word identifies at least a first row of the first image and a color associated with the first row, and wherein the second code word identifies at least one pixel of a second row of the first image and a color associated with the at least one pixel of the second row, and
receive at least a third code word and a fourth code word comprising data representing a second image depicting the second information over the one or more networks, wherein the third code word identifies at least a third row of the second image and a color associated with the third row, and wherein the fourth code word identifies at least one pixel of a fourth row of the second image and a color associated with the at least one pixel of the fourth row.

* * * * *